US011301022B2

(12) United States Patent
Alameh et al.

(10) Patent No.: US 11,301,022 B2
(45) Date of Patent: Apr. 12, 2022

(54) METHODS AND ELECTRONIC DEVICES FOR DETERMINING CONTEXT WHILE MINIMIZING HIGH-POWER SENSOR USAGE

(71) Applicant: Motorola Mobility LLC, Chicago, IL (US)

(72) Inventors: Rachid Alameh, Crystal Lake, IL (US); Zhengping Ji, Hinsdale, IL (US); Jarrett Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 513 days.

(21) Appl. No.: 15/913,467

(22) Filed: Mar. 6, 2018

(65) Prior Publication Data

US 2019/0278354 A1    Sep. 12, 2019

(51) Int. Cl.
*G06F 1/3231* (2019.01)
*G06F 9/46* (2006.01)
*H04W 52/02* (2009.01)
*G06F 3/01* (2006.01)
*H04W 24/02* (2009.01)
*G06F 16/22* (2019.01)
*H04M 1/72454* (2021.01)

(52) U.S. Cl.
CPC ............ *G06F 1/3231* (2013.01); *G06F 3/011* (2013.01); *G06F 9/461* (2013.01); *G06F 16/22* (2019.01); *H04M 1/72454* (2021.01); *H04W 24/02* (2013.01); *H04W 52/0254* (2013.01); *H04M 2250/10* (2013.01); *H04M 2250/12* (2013.01)

(58) Field of Classification Search
CPC ........................ H04M 1/72569; G06F 1/3287; G06F 1/3231; G06F 1/325; G06F 1/3234; H04W 52/0254

See application file for complete search history.

(56) References Cited

U.S. PATENT DOCUMENTS

| 8,180,583 B1 * | 5/2012 | Gossweiler ....... H04W 52/0254 702/62 |
| 9,678,559 B1 * | 6/2017 | Devries ................. G01P 15/097 |
| 2008/0049877 A1 | 2/2008 | Yu et al. |
| 2009/0125374 A1 | 5/2009 | Deaton et al. |
| 2010/0162386 A1 | 6/2010 | Li et al. |

(Continued)

OTHER PUBLICATIONS

Bian, Feng et al., "Utility-based Sensor Selection", in IPSN Apr. 2006.

(Continued)

*Primary Examiner* — Jaweed A Abbaszadeh
*Assistant Examiner* — Brian J Corcoran
(74) *Attorney, Agent, or Firm* — Philip H. Burrus, IV

(57) ABSTRACT

An electronic device includes one or more low-power context sensors, one or more high-power context sensors, and one or more processors operable with the one or more low-power context sensors and the one or more high-power context sensors. The one or more processors, working with context engines associated with the sensors, minimize usage of the high-power context sensors when determining a context of the electronic device, where that determined context has a confidence score above a predefined confidence level threshold.

20 Claims, 8 Drawing Sheets

(56) References Cited

U.S. PATENT DOCUMENTS

| | | | |
|---|---|---|---|
| 2013/0103348 A1* | 4/2013 | Cao | H04W 4/025 702/181 |
| 2013/0238535 A1* | 9/2013 | Leppanen | H04L 67/12 706/12 |
| 2014/0129560 A1* | 5/2014 | Grokop | G06N 20/00 707/737 |
| 2014/0159856 A1* | 6/2014 | Meyer | G06K 19/07345 340/5.1 |
| 2014/0247206 A1* | 9/2014 | Grokop | G06F 1/3287 345/156 |
| 2014/0297248 A1* | 10/2014 | Li | G06F 30/20 703/21 |
| 2014/0368688 A1* | 12/2014 | John Archibald | G06K 9/00993 348/222.1 |
| 2017/0094473 A1* | 3/2017 | Aksamit | H04W 4/025 |
| 2017/0185265 A1 | 6/2017 | Pierce et al. | |
| 2017/0199721 A1 | 7/2017 | Ivanov et al. | |
| 2017/0256270 A1 | 9/2017 | Singaraju et al. | |
| 2017/0302910 A1 | 10/2017 | Richards | |
| 2018/0348843 A1* | 12/2018 | de Cesare | H04W 52/0229 |

OTHER PUBLICATIONS

McIntire, Dustin et al., "The Low Power Energy Aware Processing (LEAP) Embedded Networked Sensor System", https://escholarship.org/US/item/5ft2s305; Published Jan. 1, 2005.

Pattem, Sundeep et al., "Energy-Quality Tradeoffs for Target Tracking in Wireless Sensor Networks", http://ceng.usc.edu/~bkrishna/; IPSN 2003, LNCS 2634, pp. 32-45, Published in 2003.

Zappi, Piero et al., "Activity Recognition from On-Body Sensors Accuracy-Power Trade-Off by Dynamic Sensor Selection", Department of Electronic Informatic and System, University of Bologna, Italy; www.micrel.deis.unibo.it; LNCS 4913, pp. 17-33; Published 2008.

Zhao, Feng et al., "Information-Driven Dynamic Sensor Collaboration", IEEE Signal Processing Magazine; Mar. 2002.

* cited by examiner

METHODS AND ELECTRONIC DEVICES FOR DETERMINING CONTEXT WHILE MINIMIZING HIGH-POWER SENSOR USAGE

BACKGROUND

Technical Field

This disclosure relates generally to electronic devices, and more particularly to electronic devices having one or more sensors.

Background Art

Portable electronic devices, such as smartphones, tablet computers, and palm-top computers, are continually becoming more powerful. Not too long ago a wireless telephone could only be used for making voice calls. Now smartphones pack more computing power than many desktops offered less than a decade ago.

Energy is required to make this computing power operational. While the computing power has increased, consumers continually demand that smartphones and other devices continue to shrink is size and weight. This has resulted in smaller, thinner, and lighter batteries. While some electronic components have been designed to consume small amounts of power, others require larger power budgets for operation. It would be advantageous to have an improved electronic device that better managed power consumption of its components without curtailing device functionality.

Figure 1:
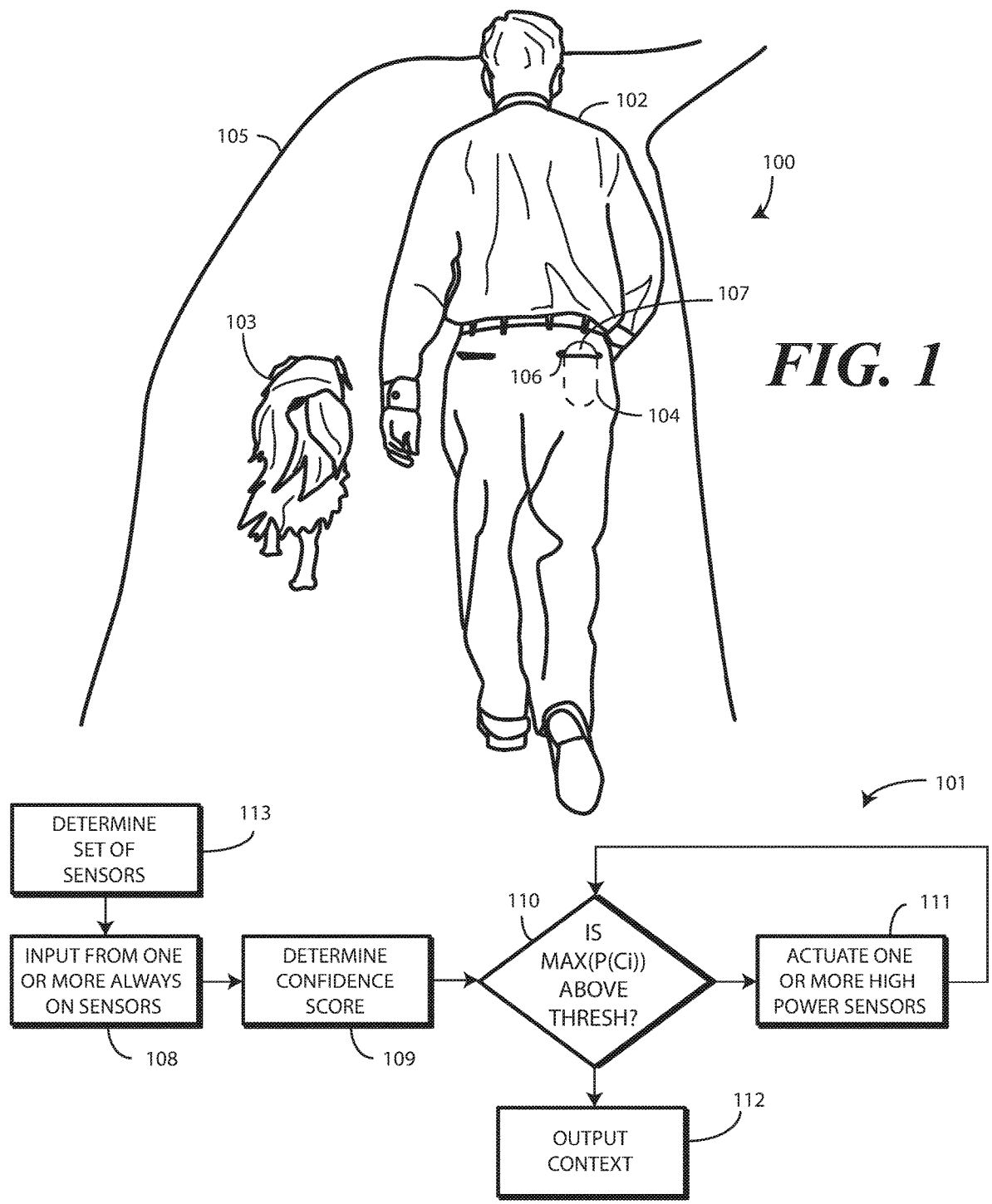
FIG. 1 illustrates one explanatory method and system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to minimizing, the one or more processors operating in conjunction with a context engine, usage of the one or more high-power context sensors when determining a context of an electronic device, where the context has a confidence score above a predefined confidence level threshold. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of selecting a set of the one or more low-power context sensors, the one or more high-power context sensors, or combinations thereof, and determining whether an aggregated sensor context determination confidence score from the inputs received from one or both of the one or more low-power context sensors or the one or more high-power context sensors exceeds a predefined confidence level threshold as described herein. The non-processor circuits may include, but are not limited to, a radio receiver, a radio transmitter, signal drivers, clock circuits, power source circuits, and user input devices.

As such, these functions may be interpreted as steps of a method to perform detecting a context with as little high-power sensor usage as possible as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure are directed to determining the "context" or "transitional context" of an electronic device while minimizing, with one or more processors, usage of the one or more high-power context sensors. As used herein, the word "context" refers to physical conditions, actions, and environments experienced by the electronic device. For example, the context of the electronic device can include the location in which the electronic device is situated, persons within the vicinity of the electronic device, motion that the electronic device is experiencing, or other actions that are occurring in an environment about the electronic device.

Each context can have one or more dimensions or modes. For example, in some embodiments, the context will be one-dimensional or "uni-modal" in that it may include location only. The context may be that the electronic device is situated in the kitchen of an authorized user's home. Alternatively, the context may be that the electronic device is situated within the authorized user's vehicle. The context may be that the electronic device is situated in a user's pocket, and so forth.

In another embodiment, the context may be two-dimensional in that two context factors are used in the context determination. Continuing the examples from above, one two-dimensional context may be that the electronic device is situated in the kitchen of an authorized user's home and the user is nearby cooking. Alternatively, the context may be that the electronic device is situated within the authorized user's vehicle, and that the vehicle is moving down the highway. The context may be that the electronic device is situated in a user's pocket and the user is running, and so forth.

Additional dimensions can be added to any context to make it multidimensional or multi-modal. Examples of dimensions include location, location in two-dimensional space, e.g., geographic location and elevation above sea level, motion, whether a person is nearby, whether a nearby person is an authorized user, what activities nearby persons are performing, the time of day, the weather, sound levels, light levels, color levels, moods of persons within an environment of the electronic device, temperature, events occurring within the environment of the electronic device, dates, social cues, optical intensity, color, light, or shadow in the environment of an electronic device, in public or private setting, alone or with others, and so forth. These are merely examples of various dimensions that can be used to determine contexts in accordance with embodiments of the disclosure. Numerous others will be obvious to those of ordinary skill in the art having the benefit of this disclosure.

To determine such contexts, be they one-dimensional contexts, e.g., the electronic device is in a car, two-dimensional contexts, e.g., the electronic device is in the kitchen and a nearby person is scrambling eggs, or multi-dimensional contexts, e.g., the electronic device is in a pocket of an authorized user, who is running, in the park, in the afternoon, while the sun is shining, toward the west, having run four miles so far, with a current heart rate of 145 beats per minute, while listening to Tom Waits, in one or more embodiments one or more processors will be operable with a context engine. The context engine can operate with the various sensors to detect, infer, capture, and otherwise determine contextual dimensions that are occurring in an environment about the electronic device.

Illustrating by example, in one or more embodiments the context engine determines assessed contexts and frameworks using adjustable algorithms of context assessment employing information, data, and events. These assessments may be learned through repetitive machine learning and data analysis. Alternatively, a user may employ the user interface to enter various parameters, constructs, rules, and/or paradigms that instruct or otherwise guide the context engine in detecting multi-dimensional social cues, emotional states, moods, and other contextual information. The context engine can comprise an artificial neural network or other similar technology in one or more embodiments.

In one or more embodiments, the context engine is operable with the one or more processors. In some embodiments, the one or more processors can control the context engine. In other embodiments, the context engine can operate independently, delivering information gleaned from detecting multi-modal contexts to the one or more processors. The context engine can receive data from the various sensors. In one or more embodiments, the one or more processors are configured to perform the operations of the context engine. Other configurations for the context engine and one or more processors, be they integrated together or separate, will be obvious to those of ordinary skill in the art having the benefit of this disclosure.

Embodiments of the disclosure contemplate that contexts of the electronic device can be most accurately determined simply by turning every single sensor ON. However, embodiments of the disclosure also understand that this maximizes sensor power drain, thereby depleting the cells of the battery and their limited stored energy quicker. This leads to reduce runtime and a sub-optimal user experience.

To correct this problem, in one or more embodiments the sensors are segregated into low-power sensors and high-power sensors. The low-power sensors are sometimes referred to as "always ON" sensors in that they are continually active when the electronic device is active, and are not actively transitioned to a low-power or sleep mode to reduce overall sensor energy consumption. These sensors draw currents less than a milliamp in one or more embodiments. Examples of low power or always ON sensors include a geolocator, proximity sensors, proximity detectors, microphones, accelerometers, and light sensors. Other examples of low power or always ON sensors will be obvious to those of ordinary skill in the art having the benefit of this disclosure. A given electronic device may not include all of these low power or always-ON sensors. Alternatively, it may, or may include additional low power or always-ON sensors.

By contrast, high-power sensors use large amounts of power when in operation. Accordingly, one or more processors of the electronic device actively transition these sensors to a low power or sleep mode when not in use. Thus, they are the opposite of always ON sensors in that they are generally turned OFF or put into a low power or sleep mode when not in operation. These sensors, which draw tens of milliamps to a few amperes, provide complex functionality. However, if left ON for long periods of time, these sensors will unnecessarily deplete energy stored in the battery, thereby reducing device run time. Examples of these high-power sensors include loudspeakers, imagers, high-resolution imagers, temperature sensors, touch sensors, high-resolution touch-sensitive displays, depth imagers, range scanners, force sensors, gaze detectors, and so forth. As with the low-power sensors, other examples of high-power sensors will be obvious to those of ordinary skill in the art having the benefit of this disclosure. A given electronic device may not include all of these high-power sensors. Alternatively, it may, or may include additional high-power sensors.

In one or more embodiments, to minimize usage of the one or more high-power context sensors when determining a context of the electronic device, a context engine determines a sensor context determination confidence score for inputs received from the various sensors. This sensor context determination confidence score can be calculated for one or both of the one or more low-power context sensors or the one or more high-power context sensors.

To determine a predefined context, in one or more embodiments one or more processors operable with the context engine select a set of the one or more low-power context sensors, the one or more high-power context sensors, or combinations thereof. The one or more processors then determine whether an aggregated sensor context determination confidence score from the inputs received from one or both of the one or more low-power context sensors or the one or more high-power context sensors exceeds a predefined confidence level threshold. Where it does, this set of sensors, which is a subset of all sensors, is used to determine the context.

Where it does not, the one or more processors expand the set of the one or more low-power context sensors, the one or more high-power context sensors, or combinations thereof to include more of the of the one or more low-power context sensors, the one or more high-power context sensors, or combinations thereof. This expansion occurs when the aggregated sensor context determination confidence score from the inputs received from one or both of the one or more low-power context sensors or the one or more high-power context sensors falls below the predefined confidence level threshold. This expansion can continue until the one or more processors identify the inputs as indicating a correctly identified context, which occurs in one or more embodiments when the aggregated sensor context determination confidence score from the inputs received from one or both of the one or more low-power context sensors or the one or more high-power context sensors exceeds the predefined confidence level threshold.

Advantageously, embodiments of the disclosure are able to try different combinations of the low-power context sensors and the high-power context sensors to determine a context, where that context has a confidence score above a predefined confidence level threshold, while minimizing the use of the high-power context sensors. This reduces power consumption by sensors in the electronic device and extends runtime. Moreover, even though the low-power sensors may be "always ON," embodiments of the disclosure contemplate that there is processing overhead associated with the one or more processors and/or context engine ingesting and processing their outputs. Advantageously, in one or more embodiments the use of the always ON sensors is also minimized to determine a context where that context has a confidence score above a predefined confidence level threshold to minimize this overhead, thereby further advantageously reducing power consumption by sensors in the electronic device and extending runtime.

Accordingly, embodiments of the present disclosure provide a sensor architecture system enabling confidence boosting and processor re-training for the context detection of multi-sensor platform in a portable electronic device, where sensor selection is a function of providing low-power device operation. Embodiments of the disclosure are applicable to various types of portable devices, including mobile phones, smartphones, electronic device attachments, tablet computers, laptop computers, moving robots, and other devices.

Sensors used by these devices can include, but are not limited to, a geo-locator, audio input sensors, audio output devices, infrared sensors, Red-Green-Blue (RGB) imagers, depth sensors, range scanners, ambient light sensors, motion sensors, and other sensors. These sensors can be categorized into two different categories: "always ON" or low-power sensors, such as the geo-locator, motion sensor, microphone, or infrared sensors, and high-power sensors such as the RGB imager, depth scanner, ambient light sensors, and motion sensors. The context engine, which can include an artificial intelligence or neural network construct, can monitor sensor output to interpret respective sensory information to make a decision with regards to electronic device contexts. The context engine model can be handcrafted or based on prior knowledge given sensor characteristics. The context engine can also be trained, based on learning amount of data associated with a context label for each data.

Turning now to FIG. 1, illustrated therein is one explanatory context 100 and method 101 configured in accordance with one or more embodiments of the disclosure. In this illustrative context 100, a user 102 is walking their dog 103, Buster, down a road. The user 102 has their electronic device 104, which is a smartphone for illustrative purposes, disposed in a back pocket 106. A portion 107 of the electronic device 104 is exposed from the pocket 106, while the remainder of the electronic device 104 is situated within the pocket 106.

As will be described in more detail below with reference to FIGS. 2 and 3, in one or more embodiments the electronic device 104 includes one or more low-power (also known as "always ON") context sensors, one or more high-power context sensors, and one or more processors. The one or more processors are operable with the one or more low-power context sensors and the one or more high-power context sensors. These sensors can be used in combination to determine the context 100. In one or more embodiments, each low-power context sensor consumes less power than a predefined power consumption threshold, such as one milliamp. In one or more embodiments, each high-power context sensor consuming more power than the predefined power consumption threshold.

This context 100 is a multidimensional or multimodal context, in that detecting this context 100 from another context, e.g., the user 102 riding a bike with the electronic device 104 disposed within a backpack, requires the detection of numerous contextual dimensions. These can include detecting motion, an in-pocket condition, a location of the user 102 along the road 105, whether Buster is with the user, how fast the user 102 is moving, and so forth. Many of these dimensions or modes can be determined in various ways. For example, determining whether Buster is with the user 102 can be determined acoustically, optically, by detecting a gate of the user 102 when walking with Buster that is distinct (e.g., slower, faster, larger steps, smaller steps, more stops, etc.) from when the user 102 is walking without Buster, and so forth. Accordingly, distinguishing this context 100 from another can be determined using various combinations of sensors.

Embodiments of the disclosure advantageously determine this context 100 of the electronic device 104 while minimizing usage of the one or more high-power context sensors. Embodiments of the disclosure do this by determining whether a combined confidence score associated with context conclusions of the combination of sensors being used is above a predefined confidence level threshold.

Each sensor has associated therewith a context determination confidence score. Illustrating by example, the context determination confidence score associated with a geo-locator of the electronic device 104 that the user 102 is walking on the road 105 would be relatively high, e.g., ninety-eight percent, with the difference between absolute confidence and the context determination confidence score being proportional to any geo-location error associated with the geo-locator system.

The microphone of the electronic device 104 may have a relatively low context determination confidence score, perhaps forty percent, that Buster is near the electronic device 104. This is true because while the microphone may pick up the jingling of Buster's collar, such jingling noises can be made from a variety of sources. By contrast, an imager of the electronic device 104, when situated on the portion 107 of the electronic device 104 exposed from the pocket 106, may have a much higher context determination confidence score, e.g., ninety-five percent, when it captures an image of Buster.

In this manner, each context sensor can have associated therewith a context determination confidence score. These scores can initially be programmed into a memory of the electronic device 104 in the factory based upon empirical testing. However, once the electronic device 104 is in the field, the context determination confidence score associated with each sensor can change as a function of machine learning and context engine retraining.

As shown in the method 101 of FIG. 1, a context engine of the electronic device 104 receives input at step 108 from at least one low-power context sensor. In one or more embodiments, the context engine receives input at step 108 from all low-power context sensors. This occurs because these low-power context sensors are "always ON" sensors. Since they are always ON, the context engine receives input at step 108 from all low-power context sensors.

However, in other embodiments, the context engine of the electronic device 104 will receive input from only a single low-power context sensor. As noted above, even though the low-power context sensors may be always ON, embodiments of the disclosure contemplate that Moreover, even though the low-power sensors may be "always ON," embodiments of the disclosure contemplate that there is processing overhead associated with the one or more processors and/or context engine ingesting and processing their outputs. Advantageously, in another embodiment the context engine of the electronic device 104 will begin receiving input from only one or two low-power context sensors. This works to minimize the use of the always-ON sensors to minimize this overhead, thereby further advantageously reducing power consumption by sensors in the electronic device and extending runtime.

In either case, at step 113, the one or more processors or the context engine of the electronic device 104 makes an initial selection of a set of sensors. Generally speaking, the selection of sensors occurring at step 113 will be a selection of one or more low-power context sensors. This selection can be a selection of a single low-power context sensor. However, in other embodiments, as determined from the context determination to be made, the set selected at step 113 can include one or more low-power context sensors, one or more high-power context sensors, or combinations thereof. The context engine of the electronic device 104 initially receives input at step 108 from this set.

At step 109, the context engine determines a sensor context determination confidence score for inputs received from the set of low-power context sensors. Using an illustrative example where the initial set selected at step 113 contains only the microphone, the context determination of "the user 102 is with Buster" may have associated therewith a context determination confidence score for this context of forty percent when the microphone detects a jingling noise.

At decision 110, the method 101 determines whether an aggregated sensor context determination confidence score from the inputs received from the sensors at step 108 exceeds a predefined confidence level threshold. The predefined confidence level threshold can be based upon a variety of factors, and can be empirically defined. Moreover, in one or more embodiments a user can select the predefined confidence level threshold they desire. For determinations where significant error can be tolerated, e.g., the context determination that the user is in the kitchen and is cooking, from which a timer application or recipe application may be launched in the electronic device, the predefined confidence level threshold may be set to a lower level, such as about seventy percent confident. By contrast, for determinations where significant error may cause issues, such as the context determination that the user is being robbed and the police should be called, the predefined confidence level threshold may be set to a higher level, such as about ninety-five percent confident.

Regardless of where the aggregated sensor context determination confidence score is set, in one or more embodiments decision 110 comprises determining whether the aggregated sensor context determination confidence score from the inputs received at step 108, as determined at step 109, exceeds a predefined confidence level threshold. Assume for the sake of argument that the user 102 has set the aggregated sensor context determination confidence score for "walking down the road with Buster, and the electronic device 104 in the pocket 106, with a portion 107 exposed from the pocket 106," to be relatively high, e.g., ninety percent. Perhaps this context determination is used to launch a camera function on the device and to capture an image, and perhaps the user 102 only wants the electronic device 104 to do this when it is nearly certain that this context is detected to avoid capturing numerous images of the interior of his pocket 106.

If the set selected at step 113 included only the microphone, i.e., one low-power context sensor, the outcome of decision 110 will be below the aggregated sensor context determination confidence score. This is true because the sensor context determination score for this context 100 from the microphone is only forty percent, which is well below the required ninety percent.

Where this occurs, the method 101 proceeds to step 111. At step 111, the context engine or the one or more processors of the electronic device 104 expand the set of sensors used for steps 108 and 109. Where that set included only one low-power context sensor, step 111 can include replacing the one low-power context sensor with another low-power context sensor. Alternatively, where the set included only one low-power context sensor, step 111 can include adding a second low-power context sensor. Where that set included only two low-power context sensors, step 111 can include adding a third low-power context sensor, and so forth.

Where that set included all low-power context sensors, step 111 can include adding a first high-power context sensor. Where the set included all low-power context sensors and one high-power context sensor, step 111 can include replacing the one high-power context sensor with another high-power context sensor. Alternatively, where the set included all low-power context sensors and one high-power context sensor, step 111 can include adding a second high-power context sensor. Where the set included all low-power context sensors and two high-power context sensors, step 111 can include adding a third high-power context sensor, and so forth.

Defined more generally, in one or more embodiments where the set of sensors employed at steps 108 and 109 includes one or more low-power context sensors, one or more high-power context sensors, or combinations thereof, step 111 can include expanding the set of the one or more low-power context sensors, the one or more high-power context sensors, or combinations thereof to include more of the of the one or more low-power context sensors, the one or more high-power context sensors, or combinations thereof. As noted, in one or more embodiments step 111 gets executed when the result of decision 110 is that the aggregated sensor context determination confidence score from the inputs received at step 108 from one or both of the one or more low-power context sensors or the one or more high-power context sensors, as determined at step 109, falls below the predefined confidence level threshold.

This process then repeats until the result of decision 110 results in the aggregated sensor context determination confidence score exceeding the predefined confidence level threshold. For this particular context, the combination of sensors required to cause the aggregated sensor context determination confidence score exceeding the predefined confidence level threshold for this particular context 100 may include a geo-locator to detect that the user 102 is on the road 105, a motion detector to determine the user 102 is walking, one or more acoustic sensors or imaging sensors to determine the user 102 is walking Buster, and a light sensor or thermal sensor to detect the in-pocket condition and the portion 107 of the electronic device 104 being exposed from the pocket 106. However, a facial depth scanner, for example, would not be needed. Advantageously, by performing the method 101 of FIG. 1, which minimizes usage of at least some the one or more high-power context sensors when determining a context of the electronic device, would leave this high-power context sensor in a low-power or sleep mode, thereby conserving power.

Figure 2:
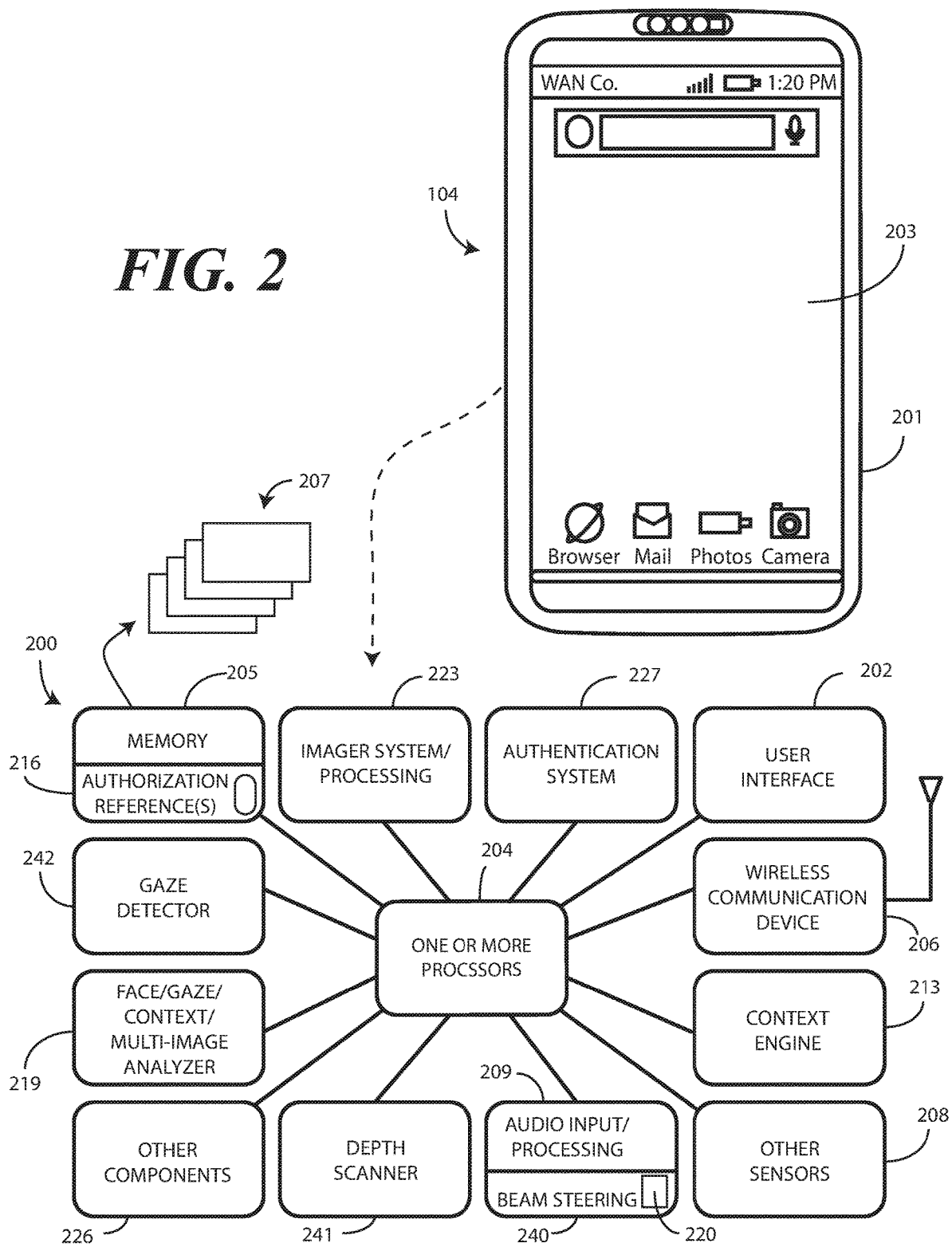
FIG. 2 illustrates one explanatory electronic device in accordance with one or more embodiments of the disclosure.
Figure 3:
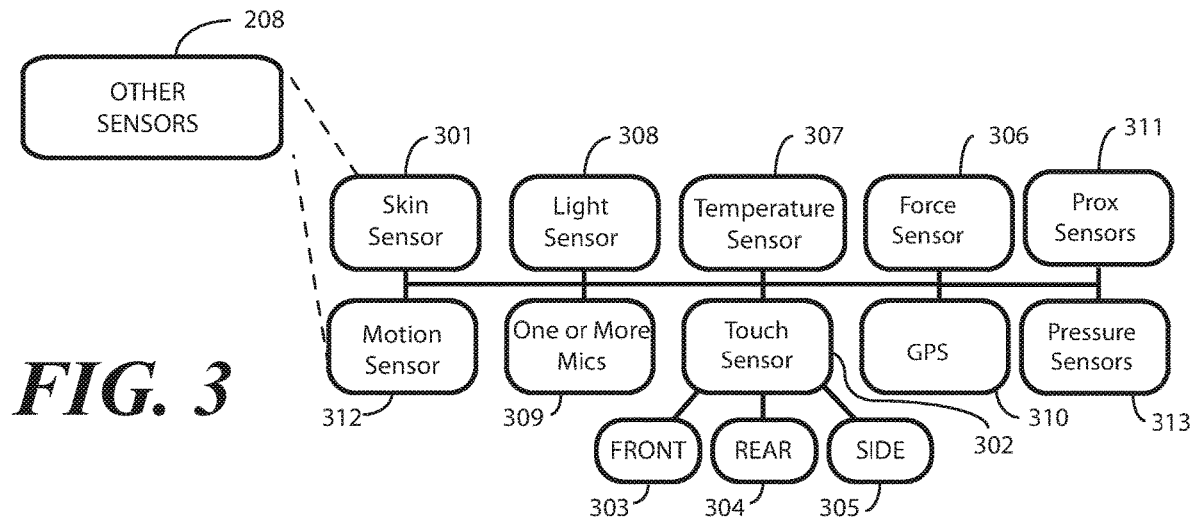
FIG. 3 illustrates explanatory sensors suitable for use in an electronic device configured in accordance with one or more embodiments of the disclosure.

Turning now to FIG. 2, illustrated therein is one explanatory electronic device 104 configured in accordance with one or more embodiments of the disclosure. Also illustrated in FIG. 2 is a block diagram schematic 200 showing components of the electronic device 104. In one or more embodiments, the block diagram schematic 200 is configured as a printed circuit board assembly disposed within a housing 201 of the electronic device 104. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 202 would be obvious to those of ordinary skill in the art having the benefit of this disclosure.

As noted above, in one or more embodiments the electronic device 104 includes one or more processors 204. In one embodiment, the one or more processors 204 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 204 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 204 can be responsible for performing the primary functions of the electronic device with which the block diagram schematic 200 is operational. For example, in one embodiment the one or more processors 204 comprise one or more circuits operable with the user interface 202 to present presentation information to a user. The executable software code used by the one or more processors 204 can be configured as one or more modules 207 that are operable with the one or more processors 204. Such modules 207 can store instructions, control algorithms, and so forth.

In one or more embodiments, the block diagram schematic 200 includes an audio input/processor 209. The audio input/processor 209 is operable to receive audio input from an environment about the electronic device 104. The audio input/processor 209 can include hardware, executable code, and speech monitor executable code in one embodiment. In one or more embodiments, the audio input/processor 209 is operable with the one or more audio transducers to receive acoustic sound from an environment of the electronic device. The audio input/processor 209 receives signals from one or more microphones in one or more embodiments.

The audio input/processor 209 can include a beam steering engine 240 comprising one or more microphones 220. Input from the one or more microphones 220 can be processed in the beam steering engine 240 such that the one or more microphones define a virtual microphone. This virtual microphone can define an acoustic reception cone that can be virtually "steered" around the electronic device 104. Alternatively, actual steering can occur as well, such as switching between a left and right microphone or a front and back microphone, or switching various microphones ON and OFF individually. In one or more embodiments, two or more microphones 220 can be included for selective beam steering by the beam steering engine 240.

Illustrating by example, a first microphone can be located on a first side of the electronic device 104 for receiving audio input from a first direction, while a second microphone can be placed on a second side of the electronic device 104 for receiving audio input from a second direction. These microphones can be "steered" by selectively turning them ON and OFF.

The beam steering engine 240 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 240 alerting it in which direction to focus the acoustic reception cone and/or steer the first microphone and the second microphone, thereby adding confirmation to audio steering and saving time.

Alternatively, the beam steering engine 240 processes and combines the signals from two or more microphones to perform beam steering. The one or more microphones 220 can be used for voice commands. In response to control of the one or more microphones 220 by the beam steering engine 240, a user location direction can be determined. The beam steering engine 240 can then select between the first microphone and the second microphone to beam steer audio reception toward the user. Alternatively, the audio input/processor 209 can employ a weighted combination of the microphones to beam steer audio reception toward the user. In either of these embodiments, each microphone can be an omnidirectional microphone element or a directional microphone element.

Various sensors 208 can be operable with the one or more processors 204. Turning briefly to FIG. 3, illustrated therein are examples of some sensors that can be operable with the one or more processors (204) as well. In one or more embodiments, many of these other sensors 208 are context sensors to detect contextual dimensions or modes about the electronic device (104). General examples of these sensors include time sensors, date sensors, environmental sensors, weather sensors, ultrasonic sensors, location sensors, and so forth.

In one embodiment, a skin sensor 301 is configured to determine when the electronic device (104) is touching the skin of a person. For example, the skin sensor 301 can detect when the electronic device (104) is being held within the hand of a user (102). The skin sensor 301 can include a substrate with an electrode disposed thereon. The electrode can confirm the object touching the skin sensor 301 is skin by detecting electrical signals generated by a heartbeat in one embodiment. Other forms of skin sensors will be obvious to those of ordinary skill in the art having the benefit of this disclosure.

A touch sensor 302 can be operable with, or in place of, the skin sensor 301. The touch sensor 302 can include a capacitive touch sensor, an infrared touch sensor, resistive touch sensors, or another touch-sensitive technology.

In one or more embodiments, the touch sensor 302 comprises a plurality of touch sensors. For example, a first touch sensor 303 can be disposed on the front major face of the electronic device 104. A second touch sensor 304 can be disposed on the rear major face of the electronic device 104. A third touch sensor 305 can be situated along one or more of the minor faces defined by the sides of the electronic device 104.

Capacitive touch-sensitive devices include a plurality of capacitive sensors, e.g., electrodes, which are disposed along a substrate. Each capacitive sensor is configured, in conjunction with associated control circuitry, e.g., the one or more processors (204), to detect an object in close proximity with—or touching—the surface of the display (203) or the housing (201) of the electronic device (104) by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

A force sensor 306 can be included. The force sensor 306 can take various forms. For example, in one embodiment, the force sensor 306 comprises resistive switches or a force switch array configured to detect contact with either the display (203) or the housing (201) of the electronic device (104). An "array" refers to a set of at least one switch. The array of resistive switches can function as a force-sensing layer, in that when contact is made with either the surface of the display (203) or the housing (201) or the touch sensors 302 of the electronic device (104), changes in impedance of any of the switches may be detected.

The array of switches may be any of resistance sensing switches, membrane switches, force-sensing switches such as piezoelectric switches, or other equivalent types of technology. In another embodiment, the force sensor 306 can be capacitive. In yet another embodiment, piezoelectric sensors can be configured to sense force as well. For example, where coupled with the lens of the display (203), the piezoelectric sensors can be configured to detect an amount of displacement of the lens to determine force. The piezoelectric sensors can also be configured to determine force of contact against the housing (201) of the electronic device (104) rather than the display (203).

A temperature sensor 307 can be configured to monitor the temperature of the environment about the electronic device (104). A light sensor 308 can be used to detect whether or not ambient light is incident on the housing (201) of the electronic device (104). The light sensor 308 can also be used to detect an intensity of ambient light is above or below a predefined threshold. In one or more embodiments the light sensor 308 can detect changes in optical intensity, color, light, or shadow in the near vicinity of the electronic device (104). In one embodiment, the light sensor 308 can be configured as an image-sensing device that captures successive images about the device and compares luminous intensity, color, or other spatial variations between images to detect weather conditions.

One or more microphones 309 can be included to receive acoustic input. While the one or more microphones 309 can be used to sense voice input, voice commands, and other audio input, in one or more embodiments they can be used as context sensors to sense contextual sounds such as the jingling of Buster's collar noted above with reference to FIG. 1.

In one or more embodiments a global positioning system device 310 can be included for determining a location and/or movement of the electronic device (104). In one or more embodiments, the global positioning system device 310 is configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device 310 autonomously or with assistance from terrestrial base stations, for example those associated with a cellular communication network or other ground based network, or as part of a Differential Global Positioning System (DGPS), as is well known by those having ordinary skill in the art.

While a global positioning system device 310 is one example of a location determination device, it will be clear to those of ordinary skill in the art having the benefit of this disclosure that other location determination devices, such as electronic compasses or gyroscopes, could be used as well. For example, the global positioning system device 310 can be replaced by, or accompanied by, a location detector able to determine location by locating or triangulating terrestrial base stations of a traditional cellular network, such as a CDMA network or GSM network, or from other local area networks, such as Wi-Fi networks.

The other sensors 208 can include proximity sensors 311. The proximity sensors 311 fall in to one of two camps: active proximity sensors and "passive" proximity sensors. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor components comprise a signal receiver to receive signals from objects external to the housing (201) of the electronic device (104). In one embodiment, the signal receiver is an infrared signal receiver to receive an infrared emission from an object such as a human being when the human is proximately located with the electronic device (104). In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors (204) of the electronic device (104) can cause each proximity sensor component to operate at a first "effective" sensitivity so as to receive infrared emissions from a first distance. Similarly, the one or more processors (204) of the electronic device (104) can cause each proximity sensor component to operate at a second sensitivity, which is less than the first sensitivity, so as to receive infrared emissions from a second distance, which is less than the first distance.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other sensors 208 can also include a motion sensor 312. The motion sensor 312 can include motion detectors, such as one or more accelerometers or gyroscopes. For example, an accelerometer may be embedded in the electronic circuitry of the electronic device (104) to show vertical orientation, constant tilt and/or whether the electronic device (104) is stationary. The measurement of tilt relative to gravity is referred to as "static acceleration," while the measurement of motion and/or vibration is referred to as "dynamic acceleration." A gyroscope can be used in a similar fashion.

Regardless of the type of motion sensors 312 that are used, in one embodiment the motion sensors 312 are also operable to detect movement, and direction of movement, of the electronic device (104) by a user. In one or more embodiments, the other sensors 208 and the motion sensors 312 can each be used to detect motion corresponding to a user's body or to human motion. These predefined motions can be small, and can include vibration, shaking, breathing, micromotions, and so forth.

For instance, if the user is walking, the motion sensors 312 can detect this movement. The one or more processors (204) can then extract parametric data from electronic signals delivered by these motion sensors 312 in response to the user walking. By comparing the parametric data to a reference file stored in memory (205) of the electronic device (104), the one or more processors (204) can identify the walking motion as corresponding to the motion of the user's body. Similarly, if the user is simply sitting in a chair, the motion sensors 312 can be used to detect body motions—even tiny ones—such as that of the user breathing.

The motion sensors 312 can be configured as an orientation detector that determines an orientation and/or movement of the electronic device (104) in three-dimensional space. The orientation detector can determine the spatial orientation of an electronic device (104) in three-dimensional space by, for example, detecting a gravitational direction. In addition to, or instead of, an accelerometer, an electronic compass can be included to detect the spatial orientation of the electronic device (104) relative to the earth's magnetic field. Similarly, one or more gyroscopes can be included to detect rotational orientation of the electronic device (104).

By comparing the parametric data extracted from this motion to a reference file stored in memory (205), a context engine can identify the fact that the movement that the electronic device (104) is experiencing is due to the fact that the electronic device (104) is proximately located with a user's torso, limbs, head, or appendages, or otherwise generally disposed along the user body instead of, for example, being placed on a table. Other user motion that can be readily detected by parametric data includes motion associated with driving, riding a bike, or simply shifting in their seat.

Inputs from the various sensors can be used to determine one or more contextual dimensions or modes. Using the example from FIG. 1, the electronic device (104) was disposed in a pocket (106) of the pants of the user (102). The other sensors 208 can detect this in one or more embodiments. For example, where an intensity of received ambient light is below a predefined threshold, there is an absence of touch sensor actuation occurring along a housing of the electronic device (104), and there is an approximately common temperature occurring at both a first location of the electronic device (104) and a second location of the electronic device (104), a context engine may conclude that the electronic device (104) is disposed within a pocket (115) or purse with a relatively high aggregated sensor context determination confidence score.

Turning now back to FIG. 2, in one or more embodiments an authentication system 227 is operable with the one or more processors 204. A first authenticator of the authentication system 227 can include an imager processing system 223. The imager processing system 223 can include one or more of an imager. In one embodiment, the imager comprises a two-dimensional imager configured to receive at least one image of an environment of the electronic device 104. In one embodiment, the imager comprises a two-dimensional Red-Green-Blue (RGB) imager. In another embodiment, the imager comprises an infrared imager. Other types of imagers suitable for use with the imager processing system 223 and the authentication system 227 will be obvious to those of ordinary skill in the art having the benefit of this disclosure.

Where included, the temperature sensor (307) can also take various forms. In one embodiment, the temperature sensor (307) is simply a proximity sensor component or referred to as presence sensor by detecting temperature change. In another embodiment, the temperature sensor (307) comprises a simple thermopile. In another embodiment, the temperature sensor (307) comprises an infrared imager that captures the amount of thermal energy emitted by an object. Other types of temperature sensors (307) will be obvious to those of ordinary skill in the art having the benefit of this disclosure.

The imager processing system 223 can be operable with a depth scanner 241. Where included, the depth scanner 241 can take a variety of forms. In a first embodiment, the depth scanner 241 comprises a pair of imagers separated by a predetermined distance, such as three to four images. This "stereo" imager works in the same way the human eyes do in that it captures images from two different angles and reconciles the two to determine distance.

In another embodiment, the depth scanner 241 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth scanner 241 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth scanner 241 adds a third "z-dimension" to the x-dimension and y-dimension defining the two-dimensional image captured by the imager.

The authentication system 227 can be operable with a face/context analyzer 219. The face/context analyzer 219 can be configured to process an image or depth scan of an object and determine whether the object matches predetermined criteria by comparing the image or depth scan to one or more predefined authentication references stored in memory 205.

For example, the face/context analyzer 219 can operate as an authentication module configured with optical and/or spatial recognition to identify objects using image recognition, character recognition, visual recognition, facial recognition, color recognition, shape recognition, and the like. Advantageously, the face/context analyzer 219, operating in tandem with the authentication system 227, can be used as a facial recognition device to determine the identity of one or more persons detected about the electronic device 104.

In one embodiment when the authentication system 227 detects a person, one or both of the imager and/or the depth imager can capture a photograph and/or depth scan of that person. The authentication system 227 can then compare the image and/or depth scan to one or more predefined authentication references stored in the memory 205. This comparison, in one or more embodiments, is used to confirm beyond a threshold authenticity probability that the person's face—both in the image and the depth scan—sufficiently matches one or more of the predefined authentication references stored in the memory 205 to authenticate a person as an authorized user of the electronic device 104.

The face/context analyzer 219 can include a gaze detector 242. The gaze detector 242 can comprise sensors for detecting the user's gaze point. The gaze detector 242 can optionally include sensors for detecting the alignment of a user's head in three-dimensional space. Electronic signals can then be processed for computing the direction of user's gaze in three-dimensional space. The gaze detector 242 can further be configured to detect a gaze cone corresponding to the detected gaze direction, which is a field of view within which the user may easily see without diverting their eyes or head from the detected gaze direction. The gaze detector 242 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector of FIG. 2.

The face/context analyzer 219 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager or the depth imager for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 226 operable with the one or more processors 204 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 226 can optionally include a barometer operable to sense changes in air pressure due to elevation changes or differing pressures of the electronic device 104. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

Any context engine 213 can then operate with any of listed sensors to detect, infer, capture, and otherwise determine persons, contextual dimensions, and contextual actions that are occurring in an environment about the electronic device 104. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information. The context engine 213 can comprise an artificial neural network or other similar technology in one or more embodiments.

In one or more embodiments, the context engine 213 is operable with the one or more processors 204. In some embodiments, the one or more processors 204 can control the context engine 213. In other embodiments, the context engine 213 can operate independently, delivering information gleaned from detecting multi-modal contexts, social cues, emotional states, moods, and other contextual information to the one or more processors 204. The context engine 213 can receive data from the various sensors. In one or more embodiments, the one or more processors 204 are configured to perform the operations of the context engine 213.

In one or more embodiments, the context engine 213 comprises a processor enabled algorithm or software module capable of detecting one or more context dimensions or modules. The context engine 213 can update contextual determination scores and factors based upon determined outputs, be they failures or successes. This training of the context engine 213 will be described in more detail below. While shown as residing in the electronic device 104, in other embodiments the context engine 213 may reside at a terminal, on a server, or otherwise on a biometric authentication system, in which case it may be accessed remotely, such as over the world wide web or Internet, using the communication circuit 206.

It is to be understood that FIG. 2 is provided for illustrative purposes only and for illustrating components of one electronic device 104 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 4:
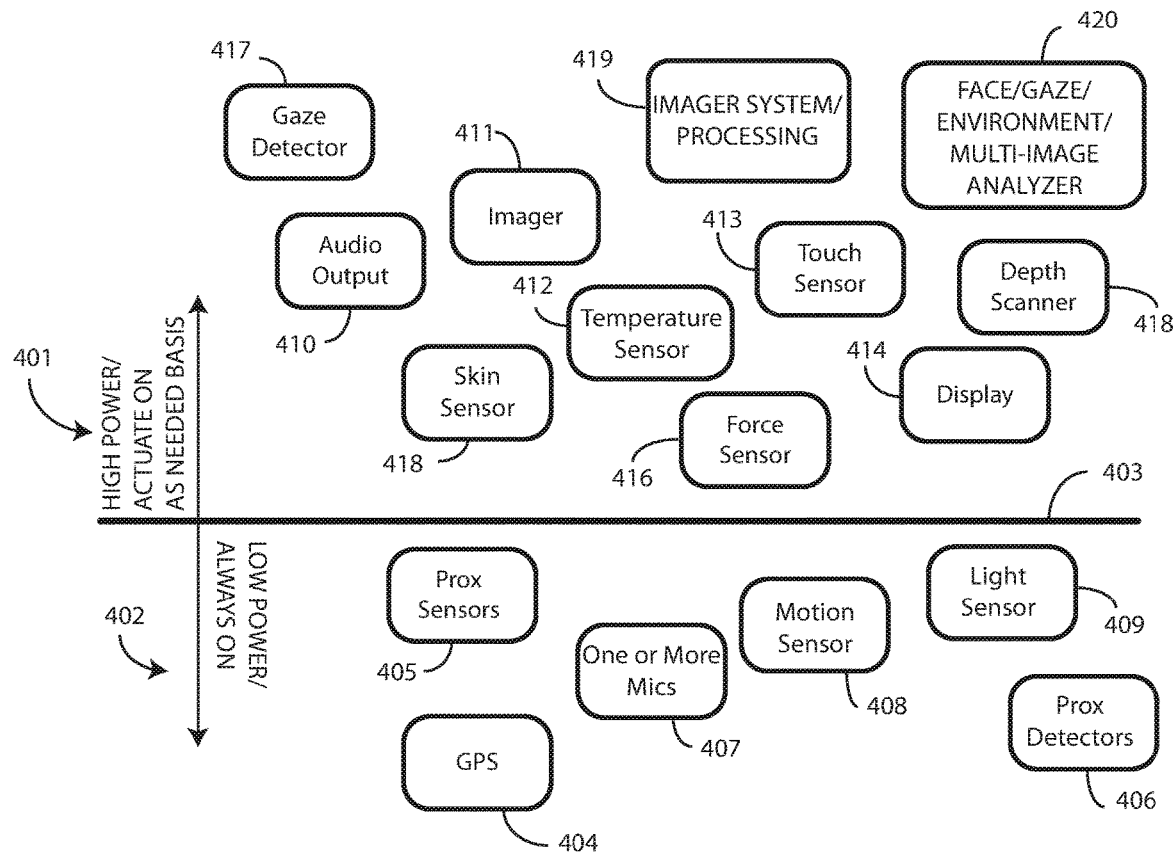
FIG. 4 illustrates various explanatory low-power context sensors and explanatory high-power context sensors configured in accordance with one or more embodiments of the disclosure.

Turning now to FIG. 4, the various sensors described above with reference to FIGS. 2 and 3 have been segregated into low-power context sensors 401 and high-power context sensor 402. As shown in FIG. 4, in one or more embodiments each low-power context sensor 401 consumes less power than a predefined power consumption threshold 403. By contrast, each high-power context sensor 402 consumes more power than the predefined power consumption threshold 403. In one or more embodiments, the predefined power consumption threshold is about one milliamp.

In one or more embodiments, the low-power context sensors 401 are referred to as "always ON" sensors in that they are continually active when the electronic device (104) is active, and are not actively transitioned to a low-power or sleep mode to reduce overall sensor energy consumption. Examples of low power or always ON sensors shown in FIG. 4 include a geolocator 404, proximity sensors 405, proximity detectors 406, microphones 407, accelerometers 408, and light sensors 409. Other examples of low power or always ON context sensors will be obvious to those of ordinary skill in the art having the benefit of this disclosure. A given electronic device may not include all of these low power or always-ON context sensors. Alternatively, it may, or may include additional low power or always-ON context sensors.

By contrast, the high-power context sensors 402 use relatively large amounts of power when in operation. Accordingly, the one or more processors of an electronic device may actively transition these high-power context sensors 402 to a low power or sleep mode when not in use. Thus, in one or more embodiments they are the opposite of always ON sensors in that they are generally turned OFF or put into a low power or sleep mode when not in operation.

These high-power context sensors 402, which draw tens of milliamps to a few amperes, provide complex functionality. However, if left ON for long periods of time, these high-power context sensors 402 will unnecessarily deplete energy stored in the battery of the electronic device, thereby reducing device run time.

Examples of these high-power context sensors 402 include loudspeakers 410, imagers 411, high-resolution imagers, temperature sensors 412, touch sensors 413, high-resolution touch-sensitive displays 414, depth scanners 415, force sensors 416, gaze detectors 417, skin sensors 418, imager processing systems 419, context analyzers 420 and so forth. As with the low-power sensors, other examples of high-power context sensors 402 will be obvious to those of ordinary skill in the art having the benefit of this disclosure. A given electronic device may not include all of these high-power context sensors 402. Alternatively, it may, or may include additional high-power context sensors 402.

Figure 5:
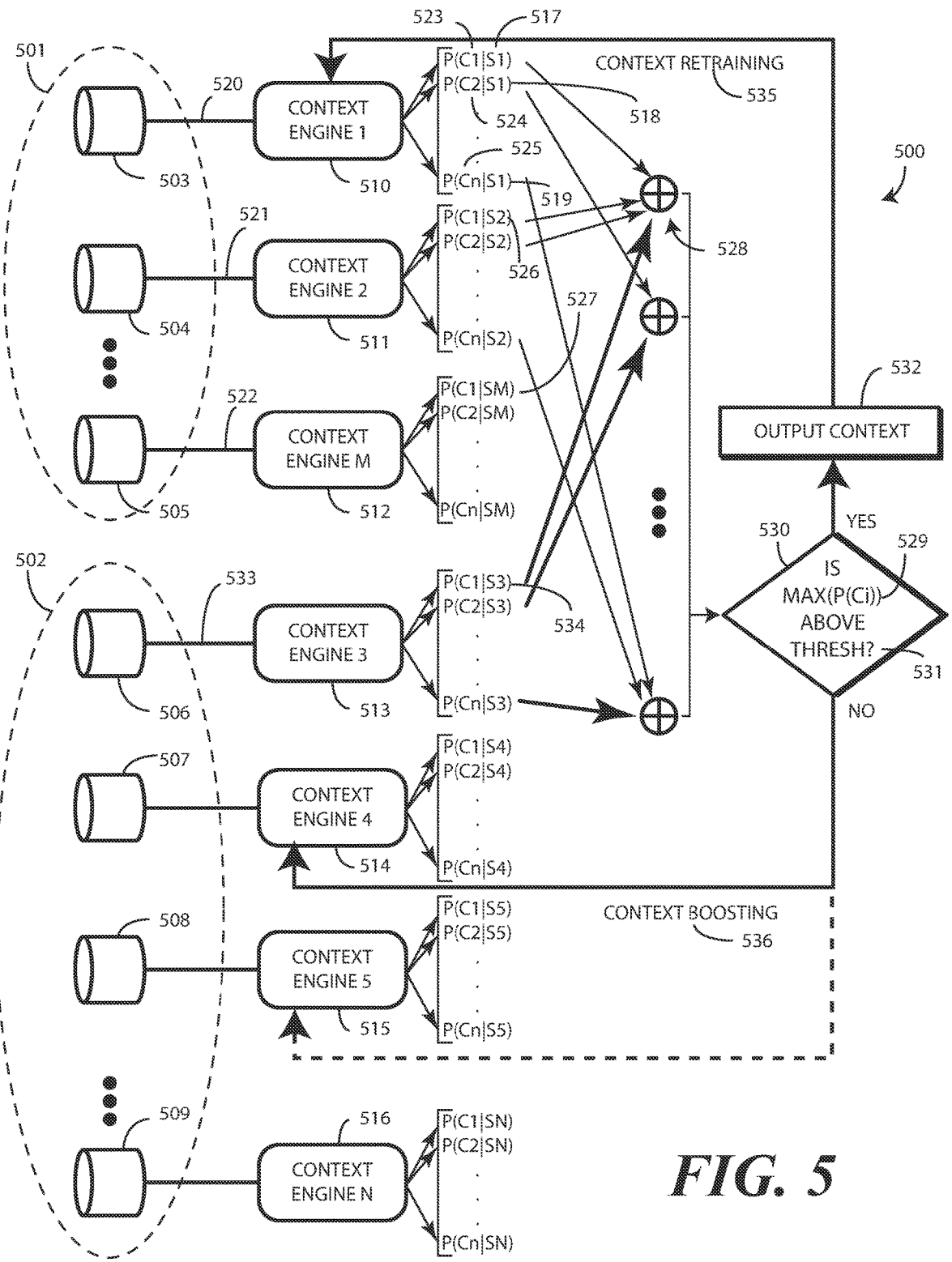
FIG. 5 illustrates one explanatory context engine in accordance with one or more embodiments of the disclosure.

Turning now to FIG. 5, illustrated therein is one embodiment of a context determination system 500, suitable for use in an electronic device (104) configured in accordance with one or more embodiments of the disclosure. As shown in FIG. 4, the sensors of the context determination system 500 have been segregated into a set 501 of one or more low-power context sensors 503,504,505 and another set 502 of one or more high-power context sensors 506,507,508,509. For ease of illustration, three low-power context sensors 503,504,505 are shown, while four high-power context sensors 506,507,508,509 are shown. However, it is to be understood that an electronic device (104) configured in accordance with embodiments of the disclosure could have more, or fewer, of either the low-power context sensors 503,504,505 or the high-power context sensors 506,507,508, 509.

Each of the low-power context sensors 503,504,505 and the high-power context sensors 506,507,508,509 is operable with a context engine 510,511,512,513,514,515,516. The context engines 510,511,512,513,514,515,516 of FIG. 5 are shown as stand alone context engines 510,511,512,513,514, 515,516, with each low-power context sensor 503,504,505 or high-power context sensor 506,507,508,509 working with a context engine 510,511,512,513,514,515,516 on a one-to-one basis. However, in other embodiments, the context engines 510,511,512,513,514, 515,516 could be integrated into a single component with inputs for each low-power context sensor 503,504,505 or high-power context sensor 506,507,508,509. Alternatively, the context engines 510, 511,512,513,514,515,516 could be integrated into a single component with the output of each low-power context sensor 503,504,505 or high-power context sensor 506,507, 508,509 being multiplexed into the component, and so forth. Moreover, the context engines 510, 511,512,513,514, 515, 516 can be stand alone components that are separate from the one or more processors (204) of the electronic device (104), or may be integrated into the one or more processors (204).

In one or more embodiments, each context engine 510, 511,512,513,514,515,516 determines a sensor context determination confidence score 517,518,519 for inputs 520,521, 522 received from each low-power context sensor 503,504, 505 or high-power context sensor 506,507,508,509. In one or more embodiments, each context engine 510,511,512, 513,514, 515,516 determines a sensor context determination confidence score 517,518,519 for each context 523,524,525 to be determined from the inputs 520,521,522 received from each low-power context sensor 503,504,505 or high-power context sensor 506,507,508,509. Illustrating by example, the first context engine 510 determines a first sensor context determination confidence score 517 for a first context 523 from the first low-power context sensor 503. The first context engine 510 also determines a second sensor context determination confidence score 518 for a second context 524 for the first low-power context sensor 503, a third sensor context determination confidence score 519 for a third context 525, and so forth. The other context engines 511, 512,513,514, 515,516 work in a similar fashion.

Each sensor context determination confidence score 517, 518,519 defines a probability that, based upon the inputs 520,521,522 received from the sensors being monitored, a particular context is correctly identified. If only one low-power context sensor 503 is being monitored, and that low-power context sensor 503 is a microphone, the sensor context determination confidence score 517 will vary based upon the input 520 received. Detecting the sound of a train whistle, for example may have a higher sensor context determination confidence score 517 where the context 523 to be determined is being at a subway station, than, for example, will be the sensor context determination confidence score 518 for the context 524 of being near a river when the sound received is running water. This is true because many things create a running water sound, e.g., faucets, burst pipes, showers, waterfalls, and hoses. However, far fewer things make a train whistle sound. This example is merely to illustrate how sensor context determination confidence scores 517,581,519 are related to the inputs 520,521,522, and how the sensor context determination confidence scores 517,581,519 can be defined or created. Other techniques and examples will be obvious to those of ordinary skill in the art having the benefit of this disclosure.

When detecting a predefined context, a set of one or more of the low-power context sensors 503 is selected. As noted above, this selection can be a selection of a single low-power context sensor, e.g., low-power context sensor 503. Even though the low-power context sensors 503,504,505 may be "always ON," embodiments of the disclosure contemplate that there is processing overhead associated with the context engines 510,511,512 and other processors engine ingesting and processing their outputs. Advantageously, in one or more embodiments the use of the always ON sensors is also minimized to determine a context 523 where that context 523 has an aggregated confidence score 529 above a predefined confidence level threshold 531 to minimize this overhead, thereby further advantageously reducing power consumption by sensors in the electronic device and extending runtime. However, in other embodiments, as determined from the context determination to be made, the set selected can include one or more low-power context sensors, e.g., low-power context sensors 503,504, all low-power context sensors 503,504,505, or a combination of low-power context sensors 503,504 and high-power context sensors 506,507.

Once this set is determined, the selected context engines 510,511,512 receive inputs 520,521,522 from the selected sensors. In this illustration, context engines 510,511,512 receive inputs 520,521,522 from all low-power context sensors 503,504,505 due to the fact that these low-power context sensors 503,504,505 are "always ON" sensors. Accordingly, they are each monitored at the initial iteration of operation. To conserve power, in one or more embodiments each of the high-power context sensors 506,507,508, 509 remains in a low power or sleep mode initially while the low-power context sensors 503,504,505 are monitored.

Each context engine 510,511,512 then determines a sensor context determination confidence score 517,526,527 for each low-power context sensor 503,504,505 of the set of the one or more low-power context sensors 503,504,505. These sensor context determination confidence scores 517,526,527 can then be aggregated to obtain an aggregated confidence score 529. Once this aggregation occurs, the context determination system 500 can determine whether the aggregated confidence score 529 exceeds a predefined confidence level threshold 531 for the particular context.

The predefined confidence level threshold 531 can be based upon a variety of factors, and can be empirically defined. Moreover, in one or more embodiments a user can select the predefined confidence level threshold 531 they desire. For determinations where significant error can be tolerated, e.g., the context determination that the user is in the kitchen and is cooking, from which a timer application or recipe application may be launched in the electronic device, the predefined confidence level threshold 531 may be set to a lower level, such as about seventy percent confident. By contrast, for determinations where significant error may cause issues, such as the context determination that the user is being robbed and the police should be called, the predefined confidence level threshold 531 may be set to a higher level, such as about ninety-five percent confident.

Where the aggregated confidence score 529 exceeds a predefined confidence level threshold 531, the context determination system 500 can identify 532 the inputs 520,521, 522 as indicating a correctly identified context, e.g., context 523. In this example, if this were true using only the low-power context sensors 503,504,505, the context determination system 500 would identify 500 the inputs 520,521, 522 from these low-power context sensors 503,504,505 as indicating the correctly identified context while any high-power context sensors 506,507,508,509 other than those in the initially selected set remain in a low-power or sleep mode.

Where it does not, the context determination system 500 expands the set of sensors used in the initial iteration. In one or more embodiments, the context determination system 500 expands the set of the one or more low-power context sensors 503,504,505 to include additional sensors. Where the initial set included all low-power context sensors 503, 504,505, this expansion can include adding a first high-power context sensor 506. Where the set included all low-power context sensors 503,504,505 and one high-power context sensor 506, this expansion can include replacing the one high-power context sensor 506 with another high-power context sensor 507. Alternatively, where the set included all low-power context sensors 503,504,505 and one high-power context sensor 506, this expansion can include adding a second high-power context sensor 507. Where the set included all low-power context sensors 503,504,505 and two high-power context sensors 506,507, step 111 can include adding a third high-power context sensor 508, and so forth.

For example, the context determination system 500 can add at least one high-power context sensor, e.g., high-power context sensor 506, when the aggregated confidence score 529 from the inputs 520,521,522 received from the initially selected low-power context sensors 503,504,505 falls below the predefined confidence level threshold 531. Continuing with this example, in one or more embodiments when the aggregated confidence score 529 is below the predefined confidence level threshold 531, the context determination system 500 actuates at least one high-power context sensor 506 of the one or more high-power context sensors 506, 507,508,509.

The process then repeats, with context engine 513 receiving additional input 533 from each high-power context sensor 506 that has been actuated of the one or more high-power context sensors 506,507,508,509. The context engine 513 determines an additional sensor context determination confidence score 534 for the actuated high-power context sensor 506. This additional sensor context determination confidence score 534 can be aggregated into the aggregated confidence score 529. The context determination system 500 can then determine whether the aggregated confidence score 529 exceeds the predefined confidence level threshold 531. Where it does, the context determination system 500 can identify 532 the inputs 520,521,522 and the additional input 533 as indicating a correctly identified context 523. Where it does not, the process can repeat again, adding another high-power context sensor 507.

In this manner, the context determination system 500 finds a combination of sensors to determine a context 523 of an electronic device, where the context 523 has an aggregated confidence score 529 above a predefined confidence level threshold 531, while at the same time minimizing usage of the high-power context sensors 506,507,508,509. Advantageously, this reduces power consumption by sensors in the electronic device and extends device runtime.

Thus, as shown and described, the context determination system 500 of FIG. 5 starts, in one embodiment, with more than one low-power context sensor 503,504,505. Each low-power context sensor 503,504,505 perceives information from the environment differently based on their differing technologies. From a predefined set of contexts 523,524,525 that can be determined, each context engine 510,511,512 provides a sensor context determination confidence score 517,526,527. These sensor context determination confidence scores 517,526,527 are then aggregated 528 for a particular context 523. In one or more embodiments, if the aggregated confidence score 529 is too small, smaller than a threshold, the aggregated confidence score 529 can be set to zero and will not account for the aggregation.

In embodiments where each context engine 511,512,513, 514,515,516 is able to provide multiple sensor context determination scores for a single context, the context engines 511,512, 513,514,515,516 are operable to rank these sensor context determination scores. In one or more embodiments, if the sensor context determination score, defined as max(P(Ci)), is larger than a preset threshold, meaning that the context determination system 500 gains enough confidence to make the prediction using only the low-power context sensors 503,504,505, the context identification is complete and the context determination system 500 outputs the context ID with highest accumulated score.

However, where the aggregated confidence score 529 from the low-power context sensors 503,504,505 is below the predefined confidence level threshold 531, in one or more embodiments the context determination system 500 will bring in additional sensors selected from the set 502 of high-power context sensors 506,507,508,509. In one or more embodiments, this step comprises actuating the selected high-power context sensors 506,507,508,509 to bring them out of a low power or sleep mode.

The way in which the high-power context sensors 506, 507,508,509 are selected for combination with the previous set can vary. In one embodiment, it is a random selection. In another embodiment, the high-power context sensors 506, 507,508,509 are selected based upon power consumption, with the lowest power-consuming sensor of the high-power context sensors 506,507,508,509 being selected first. In yet another embodiment, the high-power context sensors 506, 507,508,509 are selected as a function of a pre-learned graph connecting sensors based on correlation with low-power context sensors 503,504,505. In this case, the high-power context sensor actuated will be a function of the low-power context sensor that holds on highest confidence score with respect to the context 523 with highest aggregated confidence score 529.

As described, the context determination system then performs context identification based on the new sensor selected, and updates the aggregated confidence score 529 for the context 523 in question. Again, if the aggregated confidence score 529 for the context 523 is too small, i.e., smaller than a threshold, the aggregated confidence score 529 can be set to zero in one or more embodiments.

If the updated highest accumulated confidence score based on the newly actuated sensors does not reach the predefined confidence level threshold 531, the context determination system 500 selects yet another new sensor to boost the context confidence. This process repeats until aggregated confidence score 529 for a selected context 523 is larger than the predefined confidence level threshold 531, as noted above. Should this never occur, the context determination system 500 identifies an unclear or unknown context.

In one or more embodiments, the identified context 532 can be used to retrain the context determination system 500. Said differently, when the context determination system 500 successfully identifies 532 a context 523, this context 523 can be used as label information to further train the context determination system 500 given the corresponding sensory input.

This retraining can be conducted on sensors that failed to identify the context 523 with a sensor context determination confidence score that exceeded the predefined confidence level threshold 531, meaning that the sensor context determination confidence score for the particular context 523 was low. The retraining 536 can also be applied on the context engine 514 that has already performed a proper prediction, so as to further boost the system robustness with new coming data perceived online.

In one or more embodiments, the retraining 535,536 comprises refining a confidence score determination model at the context engine by supplementing the confidence score determination model with the confidence score of the correctly identified context. This supplementing results in the context engine generating a higher sensor context determination confidence score when receiving the input.

To illustrate the operation of the context determination system 500 of FIG. 5, presume that a user sitting inside his home by window. Presume that an electronic device comprising the context determination system 500 is placed on a table, upside down, with the display facing the table. Presume that the electronic device includes three low-power context sensors: a geo-location device indicating medium/high confidence score of an indoor context (fewer visible satellites), an infrared receiver showing no detection of background illumination due to the fact that it is upside down as determined by an accelerometer (having therefore a very low confidence score of an indoor context), and an accelerometer detecting no motion (and therefore unable to distinguish outdoor conditions from indoor conditions).

In such an example, there are three low-power context sensors and only one has a meaningful sensor context determination score for this context. As such, the aggregated confidence score 529 from these three sensors does not surpass the predefined confidence level threshold 531. The context determination system 500 may then actuate a high-power context sensor, such as an imager, which captures a picture of a ceiling and ceiling fan. Its context engine updates the aggregated confidence score 529, thus pushing the aggregated confidence score 529 above the predefined confidence level threshold 531. The indoor context is therefore identified.

The indoor context can then be used to train the context engine(s) associated with, for example, the accelerometer, that when the electronic device is upside down and stationary, it is more likely that someone is inside a house, a restaurant, etc., thus generating a higher sensor context determination confidence score when receiving the same input next time, and therefore boosting the probability of correctly identifying an indoor context when the electronic device is not moving and is upside down in the future. The indoor context can also be used to further boost context engine for the imager, to boost robustness of the corresponding context engine when predicting indoor context given captured images of a ceiling and ceiling fan as previously described. Advantageously, the context determination system 500 can further modifying a confidence score determination model at the context engine(s) by supplementing the confidence score determination model with the aggregated confidence score 529 from the inputs 520,521,522,533 received from one or both of the one or more low-power context sensors 503,504,505 or the one or more high-power context sensors 506.

Figure 6:
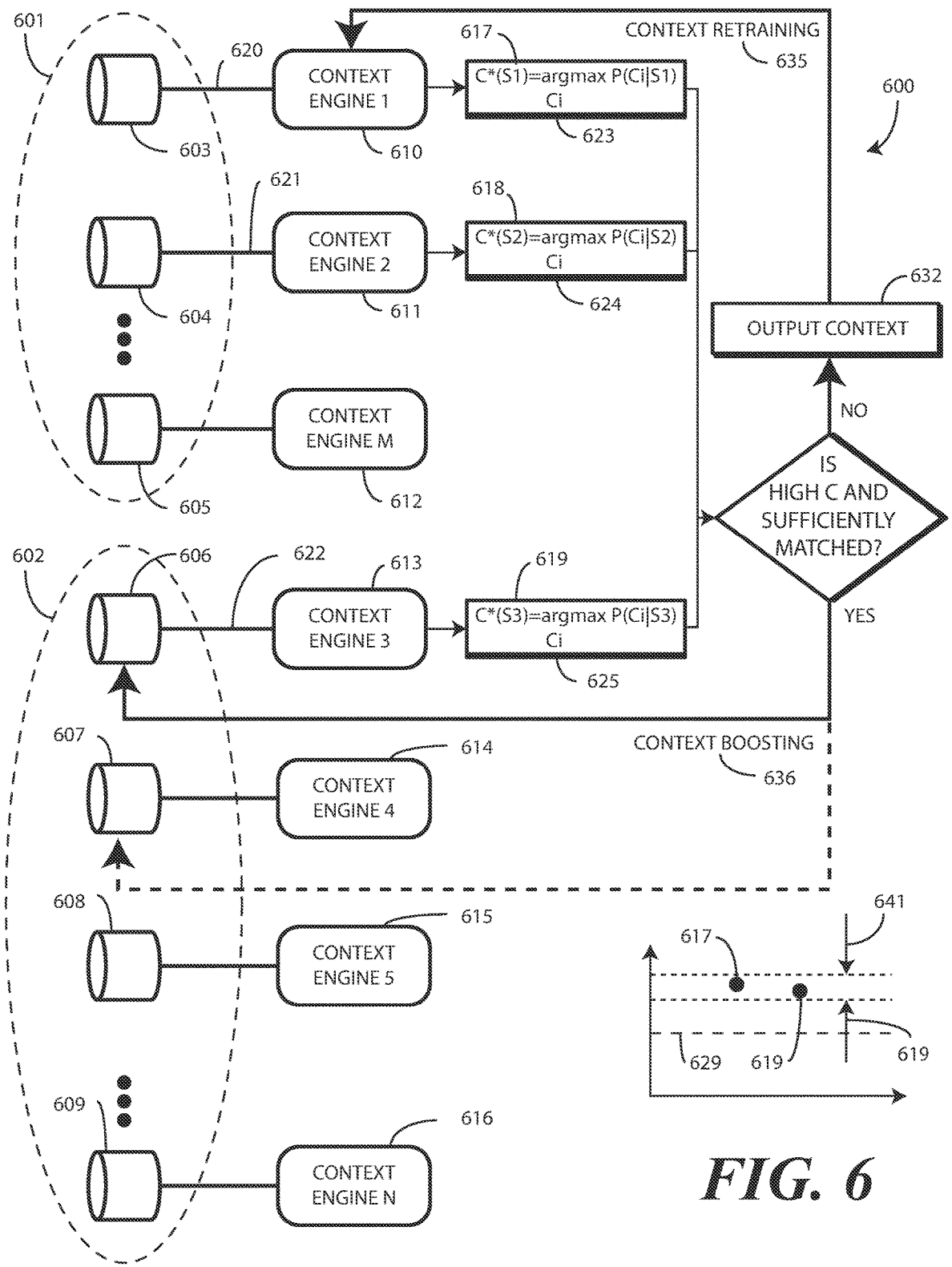
FIG. 6 illustrates another explanatory context engine in accordance with one or more embodiments of the disclosure.

Turning now to FIG. 6, illustrated therein is another context determination system 600 configured in accordance with one or more embodiments of the disclosure. The context determination system (500) of FIG. 5 employed a "accumulating" or "stacking" approach where various combinations of sensors were combined to find the minimal set yielding an aggregated sensor context determination confidence score exceeding a predefined confidence threshold level while minimizing the usage of high-power context sensors. The context determination system 600 of FIG. 6 differs from this by using a "combined" approach to detect a context when the sensor context determination scores of a pair of sensors are both (1) above a predefined confidence threshold level, and (2) are within a predefined confidence level difference threshold.

As before, the sensors of the context determination system 600 have been segregated into a set 601 of one or more low-power context sensors 603,604,605 and another set 602 of one or more high-power context sensors 606,607,608, 609. Again, three low-power context sensors 603,604,605 are shown, while four high-power context sensors 606,607, 608,609 are shown. However, it is to be understood that an electronic device (104) configured in accordance with embodiments of the disclosure could have more, or fewer, of either the low-power context sensors 603,604,605 or the high-power context sensors 606,607,608,609.

Each of the low-power context sensors 603,604,605 and the high-power context sensors 606,607,608,609 is operable with a context engine 610,611,612,613,614,615,616. The context engines 610,611,612,613,614,615,616 of FIG. 6 are shown as stand alone context engines 610,611,612,613,614, 615,616, with each low-power context sensor 603,604,605 or high-power context sensor 606,607,608,609 working with a context engine 610,611,612,613,614,615,616 on a one-to-one basis. However, in other embodiments, the context engines 610,611,612,613,614, 615,616 could be integrated into a single component with inputs, either single or multiplexed, for each low-power context sensor 603,604,605 or high-power context sensor 606,607,608,609.

In one or more embodiments, each context engine 610, 611,612,613,614,615,616 determines a sensor context determination confidence score 617,618,619 for inputs 620,621, 622 received from each low-power context sensor 603,604, 605 or high-power context sensor 606,607,608,609. In one or more embodiments, each context engine 610,611,612, 613, 614,615,616 determines a sensor context determination confidence score 617,618,619 for each context 623,624,625 to be determined from the inputs 620,621,622 received from each low-power context sensor 603,604,605 or high-power context sensor 606,607,608,609. In one or more embodiments, each sensor context determination confidence score 617,618,619 defines a maximum probability that, based upon the inputs 620,621,622 received from the sensors being monitored, a particular context is correctly identified.

Rather than selecting a set of one or more of the low-power context sensors, as was the case in FIG. 5, in this embodiment the context determination system selects a set of at least two sensors, beginning with the low-power context sensors 603,604,605. In this illustration, the context determination system 600 begins by selecting low-power context sensor 603 and low-power context sensor 604.

Once this set of at least two of the low-power context sensors 603,604 is determined, the corresponding context engines 610,611 receive inputs 620,621 from the selected sensors. To conserve power, in one or more embodiments each of the high-power context sensors 606,607,608,609 remains in a low power or sleep mode initially while the low-power context sensors 603,604 are monitored.

Each context engine 610,611 then determines a sensor context determination confidence score 617,618 for each low-power context sensor 603,604. Rather than aggregating these sensor context determination confidence scores 617, 618, as was the case above with reference to FIG. 5, in this embodiment the sensor context determination confidence scores 617,618 are instead compared. To wit, the sensor context determination confidence scores 617,618 are compared in two ways: First, they are compared to determine whether they are both above a predefined confidence level threshold 629. Second, they are compared to determine whether a difference between the sensor context determination confidence scores 617,618 is within a predefined confidence level difference threshold 641. This "double comparison" serves as a confirmation procedure for identifying a particular context 623.

As before, each of the predefined confidence level threshold 629 and the predefined confidence level difference threshold 641 can be based upon a variety of factors, and can be empirically defined. A particular context 623 may require, for example, that the sensor context determination confidence scores 617,618 are each above a predefined confidence level threshold 629 of seventy-five percent, and are within a predefined confidence level difference threshold 641 of ten percent for a particular context 623 to be positively identified.

Moreover, in one or more embodiments a user can select each of the predefined confidence level threshold 629 and the predefined confidence level difference threshold 641 that they desire. For determinations where significant error can be tolerated, the predefined confidence level threshold 629 may be set to a lower level, while the predefined confidence level difference threshold 641 is wider. By contrast, for determinations where significant error may cause issues, the predefined confidence level threshold 629 may be set to a higher level, while the predefined confidence level difference threshold 641 is narrower.

Where both the sensor context determination confidence scores 617,618 from the low-power context sensors 603,604 are each above the predefined confidence level threshold 629, and the difference of the sensor context determination confidence score 617 from the first low-power context sensor 603 and the sensor context determination confidence score 618 from the second low-power context sensor 604 is within the predefined confidence level difference threshold 641, the context determination system 600 can identify 632 the inputs and as indicating a correctly identified context 623.

Where one or both tests fail, the context determination system 600 makes adjustments. In one or more embodiments, the context determination system 600 replaces at least one sensor of the two sensors with another sensor. In one or more embodiments, this replacement occurs when either the sensor context determination confidence score 617,618 from either or both of the two low-power context sensors 603 is below the predefined confidence level threshold 629, or the difference of the sensor context determination confidence scores 617,618 from the each of the two low-power context sensors 603,604 is outside the predefined confidence level difference threshold 641.

Illustrating by example, presume the predefined confidence level threshold 629 is seventy-five percent. Now presume that the sensor context determination confidence score 617 from the first low-power context sensor 603 is only fifty percent. It would be replaced with another sensor. If both the sensor context determination confidence score 617 from the first low-power context sensor 603 and the sensor context determination confidence score 618 from the second low-power context sensor 603 are below seventy-five percent, they may both be replaced.

However, if both of the sensor context determination confidence scores 617,618 from the each of the two low-power context sensors 603,604 are above the predefined confidence level threshold 629, but the difference between the two is outside the predefined confidence level difference threshold 641, one will be replaced. In one or more embodiments, it is the low-power context sensor 603,604 having the lower sensor context determination confidence score 617, 618 that is replaced.

Once all the combinations of two low-power context sensors 603,604,605 have been tried without successfully identifying the context, low-power context sensors 603,604, 605 in the pair of sensors can be replaced with high-power context sensors 606,607,608,609. Once all the combinations of two high-power context sensors 606,607,608,609 have been tried without successfully identifying the context, combinations of three sensors are tried, then combinations of four sensors, and so forth. These higher-level combinations begin with combinations of low-power context sensors 603,604,605, then proceed to a combination of low-power context sensors 603,604,605 and high-power sensors 606, 607,608,609, and then conclude when all sensors are in the combination. The process proceeds until both the sensor context determination confidence scores from the selected combination are each above the predefined confidence level threshold 629, and the difference of the sensor context determination confidence scores from the selected combination are within the predefined confidence level difference threshold 641. When this occurs, the context determination system 600 can identify 632 the inputs and as indicating a correctly identified context 623. Where it never occurs, the context determination system 600 can denote an unidentifiable context.

As described, in one or more embodiments the context determination system 600 starts with two low-power context sensors, e.g., low-power context sensors 603,604. These low-power context sensors 603,604 perceive information based on their respective, different sensor technologies. The reason that a set of two low-power context sensors 603,604 is selected is so that each can perform a determination, and the two-part comparison can confirm whether a context is properly identified. Where the context engines 610,611 associated with the low-power context sensors 603,604 are capable of outputting multiple sensor context determination confidence scores 617,618 for a given context, the maximum sensor context determination confidence score 617,618 from each context engine 610,611 will be selected. This context with maximum confidence score can be expressed as $$C^*(S1) = \mathrm{argmax}\ P(Ci|S1)|Ci$$

where C is the confidence score for sensor one (Si), and P is the probability that context i is determined by sensor 1.

In one or more embodiments, the context determination system selects the initial two sensors based upon which corresponding context engines output higher sensor context determination confidence scores than the others. In one or more embodiments, these "top two" sensors will do a two-level "cross check" regarding their output sensor context determination confidence scores. If the two output sensor context determination confidence scores sufficiently match, i.e., are within the predefined confidence level difference threshold 641, and their output sensor context determination confidence scores are both above the predefined confidence level threshold 629, the context identification is complete.

However, If the two output sensor context determination confidence scores do not sufficiently match, i.e., are not within the predefined confidence level difference threshold 641, and/or one or both of their output sensor context determination confidence scores are below the predefined confidence level threshold 629, in one or more embodiments the context determination system 600 will either substitute a sensor as previously described or will add an additional sensor. The process repeats, with the context determination system 600 performing the same context identification using on the new sensor selected.

In one or more embodiments, if the output sensor context determination confidence scores of the new sensor combination shows a high match, i.e., is well within the predefined confidence level difference threshold 641 with one sensor context determination confidence score of the prior top-two engines, arbitration can occur to determine which sensor to keep for the next iteration. Illustrating by example, in one or more embodiments the context determination system 600 "votes" between the selected sensors to reject the one with a sensor context determination confidence score least matching the other two. Other de-selection techniques will be obvious to those of ordinary skill in the art having the benefit of this disclosure.

As noted, if sensor context determination confidence score from combinations of three sensors fail to meet the two-part test, the context determination system 600 can add a fourth sensor. In one or more embodiments, the context determination system 600 will continue adding more sensors until the two-part test is met by at least two sensors. In this case, the context determination system 600 outputs the highly matched sensor context determination confidence score. Otherwise, the system leads to an unclear or unknown context.

In one or more embodiments, the identified context 632 can be used to retrain the context determination system 600. Said differently, when the context determination system 600 successfully identifies 632 a context 623, this context 623 can be used as label information to further train the context determination system 600 given the corresponding sensory input.

This retraining can be conducted on sensors that failed to identify the context 623 with a sensor context determination confidence score that exceeded the predefined confidence level threshold 631, meaning that the sensor context determination confidence score for the particular context 623 was low. The retraining 636 can also be applied on the context engine 613 that has already performed a proper prediction, so as to further boost the system robustness with new coming data perceived online.

In one or more embodiments, the retraining 635,636 comprises refining a confidence score determination model at the context engine by supplementing the confidence score determination model with the confidence score of the correctly identified context. This supplementing results in the context engine generating a higher sensor context determination confidence score when receiving the input.

To illustrate the operation of FIG. 6 with the example from FIG. 5, presume again that a user is sitting inside his home, by window, with the electronic device comprising the context determination system 600 placed on table, upside down, with the display facing the table. Presume that the electronic device includes three low-power context sensors: a geo-location device, and infrared receiver, and an accelerometer. The geo-location device indicates medium/high confidence score of an indoor context. The infrared receiver shows no detection of background illumination due to the fact that it is upside down as determined by an accelerometer (having therefore a very low confidence score of an indoor context). The accelerometer detects no motion (low confidence and therefore unable to distinguish outdoor conditions from indoor conditions).

Because there is not have a pair of sensor with machining high confidence, the context determination system 600 then actuates a high-power context sensor, such as an imager, to compare with high confident GPS. The imager can then captures a picture of a ceiling and ceiling fan. Its sensor context determination confidence score is then compared the predefined confidence level threshold 629. Since it is, the difference of its sensor context determination confidence score and the sensor context determination confidence score of the geo-locator are compared to the predefined confidence level difference threshold 641. Since the difference is within the predefined confidence level difference threshold 641, the context is identified.

The indoor context can then be used to train the context engine(s) associated with, for example, the accelerometer, that when the electronic device is upside down and stationary, it is more likely that someone is inside a house, a restaurant, etc., thus generating a higher sensor context determination confidence score when receiving the same input next time, and therefore boosting the probability of correctly identifying an indoor context when the electronic device is not moving and is upside down in the future. The indoor context can also be used to further boost context engine for the imager, to boost robustness of the corresponding context engine when predicting indoor context given captured images of a ceiling and ceiling fan as previously described. Advantageously, the context determination system 600 can further modify a confidence score determination model at the context engine(s) by supplementing the confidence score determination model with the other sensor context determination confidence scores, thereby boosting the probability of indoor context detection the next time the electronic device is not moving and put upside down.

Figure 7:
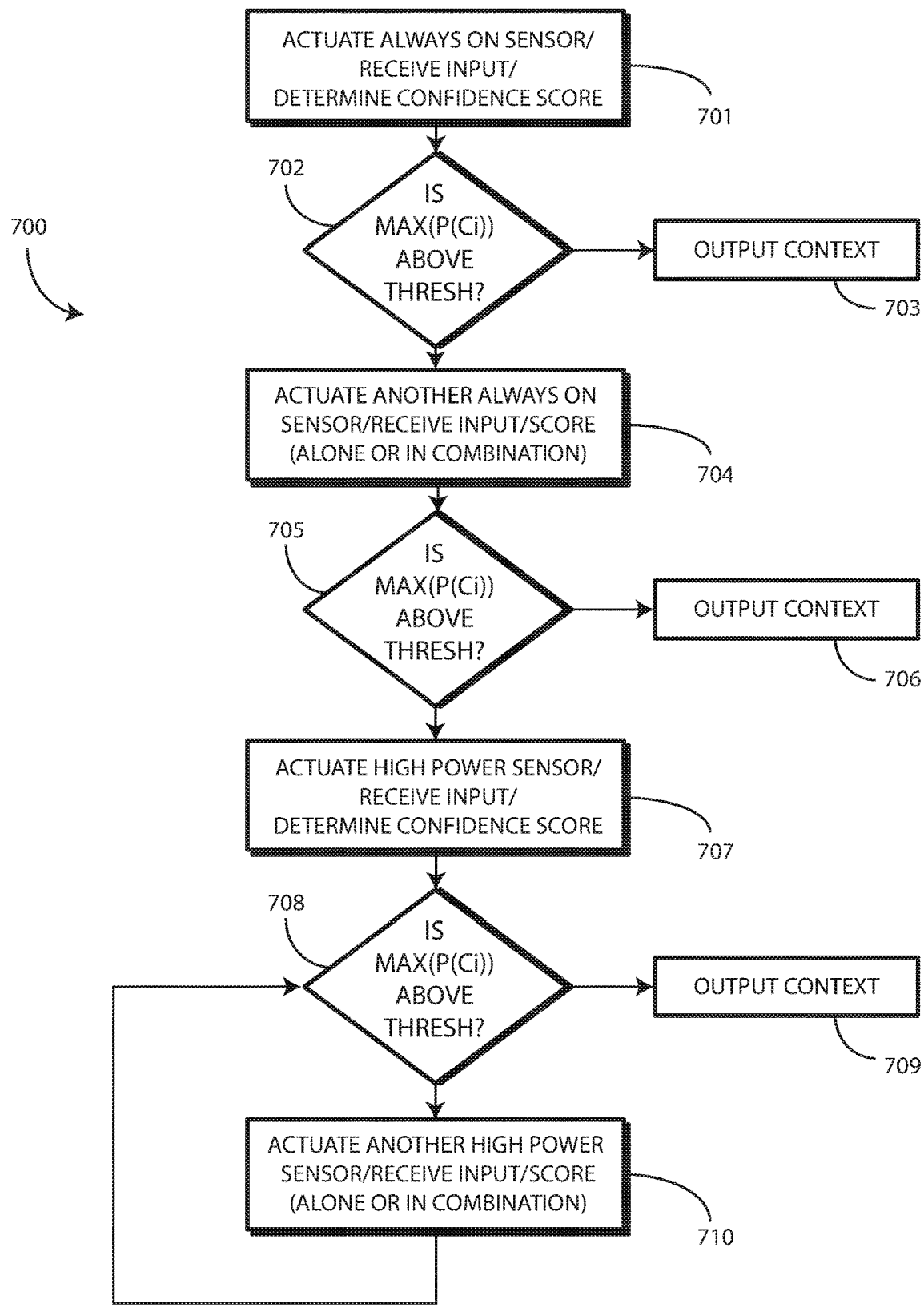
FIG. 7 illustrates one explanatory method in accordance with one or more embodiments of the disclosure.

Turning now to FIG. 7, illustrated therein is one explanatory method 700 for an electronic device comprising one or more low-power context sensors, one or more high-power context sensors, and one or more processors operable with the one or more low-power context sensors and the one or more high-power context sensors. In one or more embodiments, the method 700 results in minimizing, with the one or more processors, usage of the one or more high-power context sensors when determining a context of the electronic device, where the context has a confidence score above a predefined confidence level threshold.

At step 701, the method 700 selects, with the one or more processors, a set of the one or more low-power context sensors. At step 701, one or more context engines corresponding to the one or more low-power context sensors receive input from each low-power context sensor of the set of the one or more low-power context sensors. At step 701, the one or more context engines determine a sensor context determination confidence score for each of the one or more low-power context sensors. At step 701, the sensor context determination scores fore each low-power context sensor of the set of low-power context sensors are aggregated.

At decision 702, the method 700 determines whether the aggregated confidence score exceeds a predefined confidence levee threshold. Where it does, at step 703 the method identifies, with the one or more processors, the input as indicating a correctly identified.

Where it does not, the method proceeds to step 704. At step 704, the method 700 adds, with the one or more processors, another low-power context sensor. At step 704, one or more context engines corresponding to the one or more low-power context sensors receive input from each low-power context sensor of the set of the one or more low-power context sensors. At step 704, the one or more context engines determine a sensor context determination confidence score for each of the one or more low-power context sensors. At step 704, the sensor context determination scores fore each low-power context sensor of the set of low-power context sensors are aggregated.

At decision 705, the method 700 determines whether the aggregated confidence score exceeds a predefined confidence levee threshold. Where it does, at step 705 the method identifies, with the one or more processors, the input as indicating a correctly identified. Where it does not, step 704 and decision 705 can repeat until all low-power context sensors are in the set. In one or more embodiments, these steps and decisions occur while the high-power context sensors are each in a low power or sleep mode.

Once all low-power context sensors are in the set, the method 700 proceeds to step 707. At step 707, the method 700 actuates, with the one or more processors, a high-power context sensor. At step 707 one or more context engines corresponding to the one or more low-power context sensors and the high-power context sensor receive input from each low-power context sensor and the high-power context sensor. At step 707, the one or more context engines determine a sensor context determination confidence score for each of the one or more low-power context sensors and the high-power context sensor. At step 707, the sensor context determination scores fore each low-power context sensor and the high-power context sensor in the set are aggregated.

At decision 708, the method 700 determines whether the aggregated confidence score exceeds a predefined confidence levee threshold. Where it does, at step 709 the method identifies, with the one or more processors, the input as indicating a correctly identified. Where it does not, step 707 and decision 708 can repeat until all high-power context sensors are in the set.

At step 710, training can occur. In one embodiment, step 710 comprises refining a confidence score determination model at the context engine by supplementing the confidence score determination model with the confidence score of the correctly identified context. In one embodiment, the supplementing of step 710 results in the context engine generating a higher sensor context determination confidence score when receiving the input.

Figure 8:
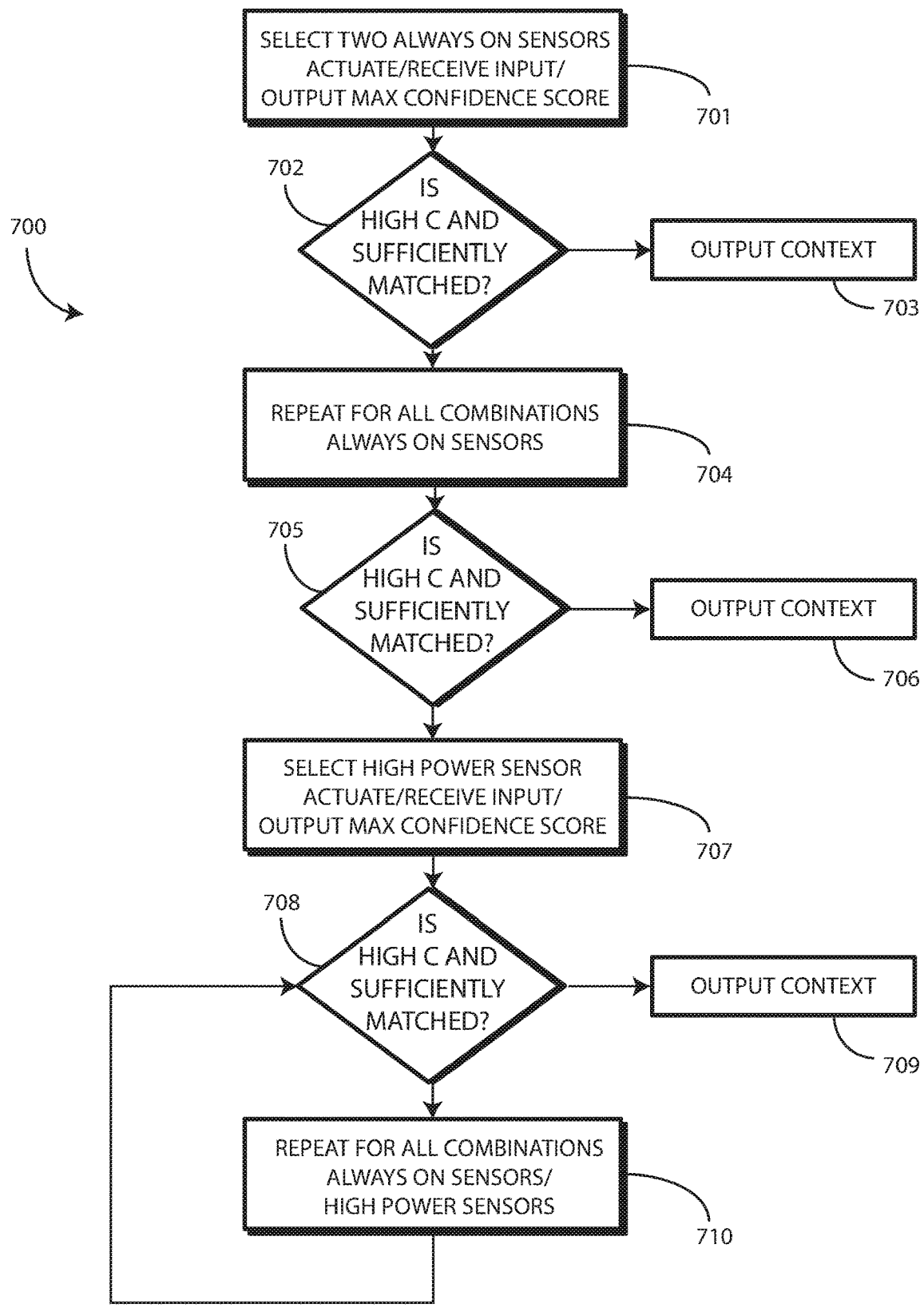
FIG. 8 illustrates another explanatory method in accordance with one or more embodiments of the disclosure.

Turning now to FIG. 8, illustrated therein is another explanatory method 800 for an electronic device comprising one or more low-power context sensors, one or more high-power context sensors, and one or more processors operable with the one or more low-power context sensors and the one or more high-power context sensors. In one or more embodiments, the method 800 results in minimizing, with the one or more processors, usage of the one or more high-power context sensors when determining a context of the electronic device, where the context has a confidence score above a predefined confidence level threshold.

At step 801, the method 800 selects, with the one or more processors, a set of at least two more low-power context sensors. At step 801, one or more context engines corresponding to the one or more low-power context sensors receive input from each low-power context sensor of the set of the one or more low-power context sensors. At step 801, the one or more context engines determine a sensor context determination confidence score for each of the one or more low-power context sensors. In one or more embodiments, the sensor context determination confidence score comprises a maximum sensor context determination confidence score selected from a plurality of sensor context determination confidence scores for the each sensor of the two sensors.

At decision 802, the method 800 determines whether the sensor context determination confidence score from the first low-power context sensor and from the second low-power context sensor are above the predefined confidence level threshold. At decision 802, the method 800 also determines whether a difference of the sensor context determination confidence score from the first low-power context sensor and from the second low-power context sensor is within a predefined confidence level difference threshold.

Where both are true, at step 803 the method identifies, with the one or more processors, the input as indicating a correctly identified. Where it does not, the method proceeds to step 804.

At step 804, the method 800 replaces at least one sensor of the two sensors with another sensor. In at least one iteration, the set of two sensors will comprise one low-power context sensor and one high-power context sensor. At step 804, one or more context engines corresponding to the new set of sensors receive input from each sensor of the set. At step 804, the one or more context engines determine a sensor context determination confidence score for each of the sensors.

At decision 805, the method 800 determines whether the sensor context determination confidence score from the new set of sensors are above the predefined confidence level threshold. At decision 805, the method 800 also determines whether a difference of the sensor context determination confidence score from the first low-power context sensor and from the second low-power context sensor is within a predefined confidence level difference threshold.

Where both are true, at step 806 the method identifies, with the one or more processors, the input as indicating a correctly identified. Where it does not, the method proceeds to step 807.

At step 807, the method 800 adds additional sensors to the set. At step 807, one or more context engines corresponding to the new set of sensors receive input from each sensor of the set. At step 807, the one or more context engines determine a sensor context determination confidence score for each of the sensors.

At decision 808, the method 800 determines whether the sensor context determination confidence score from the new set of sensors are above the predefined confidence level threshold. At decision 808, the method 800 also determines whether a difference of the sensor context determination confidence score from the first low-power context sensor and from the second low-power context sensor is within a predefined confidence level difference threshold. Where both are true, at step 809 the method identifies, with the one or more processors, the input as indicating a correctly identified.

At step 810, training can occur. In one embodiment, step 810 comprises refining a confidence score determination model at the context engine by supplementing the confidence score determination model with the confidence score of the correctly identified context. In one embodiment, the supplementing of step 810 results in the context engine generating a higher sensor context determination confidence score when receiving the input.

Figure 9:
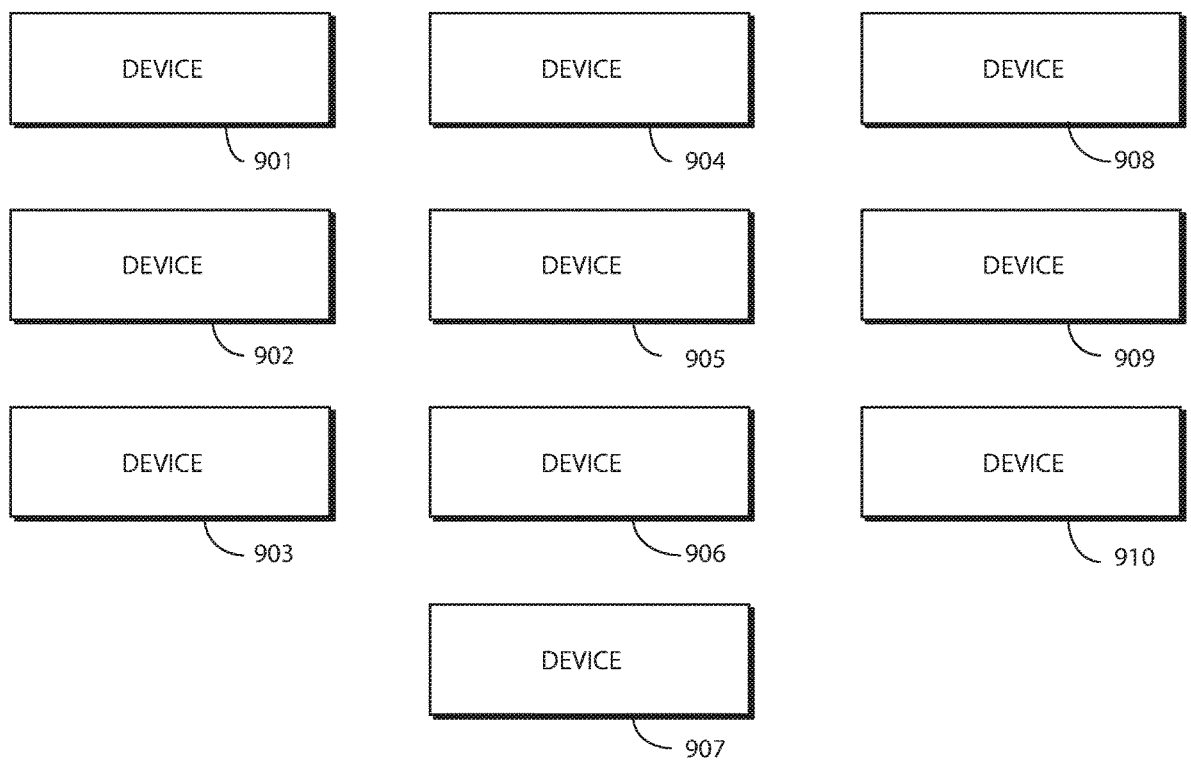
FIG. 9 illustrates various embodiments of the disclosure.

Turning now to FIG. 9 (the device component should be 901-910), illustrated therein are various embodiments of the disclosure. T 901, an electronic device comprises one or more low-power context sensors. At 901, each low-power context sensor consumes less power than a predefined power consumption threshold. At 901, the electronic device also comprises one or more high-power context sensors. At 901, each high-power context sensor consumes more power than the predefined power consumption threshold.

At 901, a context engine determines a sensor context determination confidence score for inputs received from one or both of the one or more low-power context sensors or the one or more high-power context sensors. At 901, one or more processors, operable with the context engine, select a set of the one or more low-power context sensors, the one or more high-power context sensors, or combinations thereof and determine whether an aggregated sensor context determination confidence score from the inputs received from one or both of the one or more low-power context sensors or the one or more high-power context sensors exceeds a predefined confidence level threshold.

At 902, the one or more processors of 901 expand the set of the one or more low-power context sensors, the one or more high-power context sensors, or combinations thereof to include more of the of the one or more low-power context sensors, the one or more high-power context sensors, or combinations thereof. In one or more embodiments, 902 occurs when the aggregated sensor context determination confidence score of 901 from the inputs received from one or both of the one or more low-power context sensors or the one or more high-power context sensors falls below the predefined confidence level threshold.

At 903, the one or more processors of 901 identify the inputs as indicating a correctly identified context when the aggregated sensor context determination confidence score from the inputs received from one or both of the one or more low-power context sensors or the one or more high-power context sensors exceeds the predefined confidence level threshold.

At 904, the one or more processors of 903 further modify a confidence score determination model at the context engine by supplementing the confidence score determination model with the aggregated sensor context determination confidence score from the inputs received from one or both of the one or more low-power context sensors or the one or more high-power context sensors. At 905, the one or more processors of 903 identify the inputs as indicating the correctly identified context while any high-power context sensors other than those in the set remain in a low power or sleep mode. At 906, the one or more processors of 903 select the set to minimize power consumed by the one or more high-power context sensors.

At 907, an electronic device comprises one or more low-power context sensors. At 907, each low-power context sensor consumes less power than a predefined power consumption threshold. At 907, the electronic device comprises one or more high-power context sensors. At 907, each high-power context sensor consumes more power than the predefined power consumption threshold.

At 907, a context engine determines a sensor context determination confidence score for inputs received from one or both of the one or more low-power context sensors or the one or more high-power context sensors. At 907, one or more processors, operable with the context engine, select two sensors from the one or more low-power context sensors, the one or more high-power context sensors, or combinations thereof. At 907, the one or more processors compare the sensor context determination confidence score from each of the two sensors and determine whether the sensor context determination confidence score from the each of the two sensors is above a predefined confidence level threshold and whether a difference of the sensor context determination confidence score from the each of the two sensors is within a predefined confidence level difference threshold.

At 908, the one or more processors of 907 replace at least one sensor of the two sensors of 907 with another sensor when either the sensor context determination confidence score from the each of the two sensors is below the predefined confidence level threshold or the difference of the sensor context determination confidence score from the each of the two sensors is outside the predefined confidence level difference threshold.

At 909, the two sensors of 907 comprise one low-power context sensor and one high-power context sensor. At 910, the sensor context determination confidence score of 907 comprises a maximum sensor context determination confidence score selected from a plurality of sensor context determination confidence scores for each sensor of the two sensors.

As illustrated and described, embodiments of the disclosure provide a multi-sensor context identification system that includes a plurality of sensors. In one or more embodiments, these sensors are grouped as "always ON low-power sensors" and "not-always ON high-power sensors." A context engine is operable with each sensor. Sufficiently accurate context detection is achieved when the confidence level accumulation between the sensors reaches a certain predefined threshold. In one or more embodiments the sets checked begin with the always-ON sensors and gradually enable the high-power sensors if needed.

In another embodiment, sensors are again segregated as as always ON low-power and not-always ON high-power sensors. Again a context engine is operable with sensor. In this embodiment, at least two sensor outputs are assessed for each of the contexts stored in the device. Accurate context detection is achieved when the match between the at least two sensors reaches a set threshold with acceptable confidence level. Again, in one or more embodiments the sets checked begin with the always-ON sensors and gradually enabling high power sensors if needed to achieve match.

In one or more embodiments, a method is provided for storing in device a plurality of context and transitional environments, and gradual assessing each sensor contribution to the stored environments and conducting confidence voting and match voting before ceasing detection operation. In one or more embodiments, a method for starting with always on low power sensors and only triggering high power sensors to until confidence accumulation level is reached or match sensor-senor match level is reached.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device comprising one or more low-power context sensors, one or more high-power context sensors, and one or more processors operable with the one or more low-power context sensors and the one or more high-power context sensors, the method comprising minimizing, with the one or more processors, usage of the one or more high-power context sensors when determining a context of the electronic device, where the context has a confidence score above a predefined confidence level threshold, wherein the minimizing comprises:
   selecting, with the one or more processors, a set of at least two of the one or more low-power context sensors;
   receiving input from each low-power context sensor of the set of at least two of the one or more low-power context sensors; and
   determining, with a context engine operable with the one or more processors, a sensor context determination confidence score for the context from the input for each low-power context sensor of the set of at least two of the one or more low-power context sensors; and
   determining, with the context engine, at least one other sensor context determination confidence score for at least one other context from the input for each low-power context sensor of the one or more low-power context sensors;
   determining whether the sensor context determination confidence score from a first low-power context sensor and from a second low-power context sensor are above the predefined confidence level threshold; and
   also determining whether a difference of the sensor context determination confidence score from the first low-power context sensor and from the second low-power context sensor is within a predefined confidence level difference threshold;
   wherein the predefined confidence level threshold is defined by a first percentage and the predefined conference level difference threshold is defined by a second percentage that is less than the first percentage; and
   further comprising identifying, with the one or more processors, the input and as indicating a correctly identified context when both:
      the sensor context determination confidence score from the first low-power context sensor and from the second low-power context sensor are both above seventy-five percent; and
      the difference of the sensor context determination confidence score from the first low-power context sensor and from the second low- power context sensor is within ten percent the predefined confidence level difference threshold.

2. The method of claim 1, wherein the minimizing further comprises:
   aggregating each sensor context determination score to obtain the confidence score; and determining whether the confidence score exceeds the predefined confidence level threshold.

3. The method of claim 2, further comprising identifying, with the one or more processors, the input as indicating a correctly identified context when the confidence score exceeds the predefined confidence level threshold.

4. The method of claim 2, wherein when the confidence score is below the predefined confidence level threshold the minimizing further comprises:
actuating, with the one or more processors, at least one high-power context sensor of the one or more high-power context sensors;
receiving additional input from each high-power context sensor of the one or more high-power context sensors;
determining, with the context engine, an additional sensor context determination confidence score for each high-power context sensor of the one or more high-power context sensors;
aggregating the additional sensor context determination confidence score into the confidence score; and
again determining whether the confidence score exceeds the predefined confidence level threshold.

5. The method of claim 4, further comprising identifying, with the one or more processors, the input and the additional input as indicating a correctly identified context when the confidence score exceeds the predefined confidence level threshold.

6. The method of claim 5, further comprising refining a confidence score determination model at the context engine by supplementing the confidence score determination model with the confidence score of the correctly identified context.

7. The method of claim 6, wherein the supplementing results in the context engine generating a higher sensor context determination confidence score when receiving the input.

8. The method of claim 2, further comprising, when the confidence score fails to exceed the predefined confidence level threshold:
selecting, with the one or more processors, another low-power context sensor to increase a number of low-power context sensors of the set of the at least two of the one or more low-power context sensors;
receiving another input from the another low-power context sensor; and
determining, with the context engine, another sensor context determination confidence score for another context from the another input.

9. The method of claim 8, wherein the minimizing further comprises:
again aggregating each sensor context determination score to again obtain the confidence score; and
again determining whether the confidence score exceeds the predefined confidence level threshold.

10. The method of claim 8, further comprising repeating the selecting the another low-power context sensor to increase the number of low-power context sensors of the set of the at least two of the one or more low-power context sensors until all low-power sensors of the electronic device are included in the set of the at least two of the one or more low-power context sensors.

11. The method of claim 10, further comprising actuating a high-power context sensor.

12. The method of claim 11, wherein the high-power context sensor comprises an imager.

13. The method of claim 1, wherein the set of the at least two of the one or more low-power context sensors comprises three or more low-power context sensors.

14. The method of claim 1, wherein the set of at least two of the one or more low-power context sensors comprises a proximity detector.

15. The method of claim 1, further comprising refining a confidence score determination model at the context engine by supplementing the confidence score determination model with the confidence score of the correctly identified context to improve the confidence score determination model.

16. The method of claim 1, wherein the set of at least two of the one or more low-power context sensors comprises a geolocator.

17. The method of claim 1, wherein the set of at least two of the one or more low-power context sensors comprises a proximity sensor.

18. The method of claim 1, wherein the set of at least two of the one or more low-power context sensors comprises a microphone.

19. The method of claim 1, wherein the set of at least two of the one or more low-power context sensors comprises an accelerometer.

20. The method of claim 1, wherein the set of at least two of the one or more low-power context sensors comprises a light sensor.

* * * * *